United States Patent
Nagano et al.

(10) Patent No.: US 7,750,943 B2
(45) Date of Patent: Jul. 6, 2010

(54) IMAGE PROCESSING DEVICE THAT REMOVES MOTION BLUR FROM AN IMAGE AND METHOD OF REMOVING MOTION BLUR FROM AN IMAGE

(75) Inventors: Takahiro Nagano, Kanagawa (JP); Tetsujiro Kondo, Tokyo (JP); Tsutomu Watanabe, Kanagawa (JP); Junichi Ishibashi, Saitama (JP); Hisakazu Shiraki, Kanagawa (JP); Naoki Fujiwara, Tokyo (JP); Masanori Kanemaru, Kanagawa (JP); Shinichiro Kaneko, Tokyo (JP); Yasuhiro Suto, Tokyo (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 11/793,701

(22) PCT Filed: Dec. 21, 2005

(86) PCT No.: PCT/JP2005/024000
§ 371 (c)(1), (2), (4) Date: Jun. 21, 2007

(87) PCT Pub. No.: WO2006/068292
PCT Pub. Date: Jun. 29, 2006

(65) Prior Publication Data
US 2008/0095400 A1 Apr. 24, 2008

(30) Foreign Application Priority Data
Dec. 21, 2004 (JP) .............................. 2004-369265

(51) Int. Cl.
*H04N 5/232* (2006.01)
(52) U.S. Cl. .............................. 348/208.12; 348/208.1; 348/208.2
(58) Field of Classification Search ............ 348/208.99, 348/208.2, 208.3, 208.12, 208.14, 208.1
See application file for complete search history.

(56) References Cited

U.S. PATENT DOCUMENTS

2003/0011717 A1* 1/2003 McConica .................. 348/699

(Continued)

FOREIGN PATENT DOCUMENTS

JP 2001 250119 9/2001

(Continued)

OTHER PUBLICATIONS

U.S. Appl. No. 11/722,450, filed Jun. 21, 2007, Nagano, et al.

(Continued)

*Primary Examiner*—Jason Whipkey
(74) *Attorney, Agent, or Firm*—Oblon, Spivak, McClelland, Maier & Neustadt, L.L.P.

(57) ABSTRACT

A shooting-information-detecting section detects shooting information from an image pick-up section. A motion-detecting section detects a motion direction of an image on an overall screen based on a motion direction of the image pick-up section contained in the shooting information. A processing-region-setting section sets a processing region in at least any one of a predicted target image and a peripheral image thereof, which correspond to a target pixel in the predicted target image. A processing-coefficient-setting section sets a motion-blur-removing-processing coefficient that corresponds to the motion direction detected in the motion-detecting section. A pixel-value-generating section generates a pixel value that corresponds to the target pixel based on a pixel value of a pixel in the processing region set in the processing-region-setting section and the processing coefficient set in the processing-coefficient-setting section. Motion-blur-removing processing can be accurately performed.

12 Claims, 25 Drawing Sheets

U.S. PATENT DOCUMENTS

| | | | |
|---|---|---|---|
| 2003/0219156 A1* | 11/2003 | Muraki | 382/167 |
| 2004/0081335 A1* | 4/2004 | Kondo et al. | 382/107 |
| 2004/0105493 A1* | 6/2004 | Kondo et al. | 375/240.08 |
| 2006/0062433 A1* | 3/2006 | Ikeda | 382/107 |
| 2006/0093233 A1* | 5/2006 | Kano et al. | 382/254 |

FOREIGN PATENT DOCUMENTS

| | | |
|---|---|---|
| JP | 2002 373336 | 12/2002 |
| JP | 2003 233817 | 8/2003 |

OTHER PUBLICATIONS

U.S. Appl. No. 11/722,141, filed Jun. 19, 2007, Nagano, et al.
U.S. Appl. No. 11/722,460, filed Jun. 21, 2007, Nagano, et al.
U.S. Appl. No. 11/722,436, filed Jun. 21, 2007, Nagano, et al.

* cited by examiner

FIG. 13

| P40 | | P42<br>(DP42) | | P44 P45<br>(DP44) (DP45) | | P47<br>(DP47) | | P49 P50<br>(DP49) (DP50) | | P52<br>(DP52) | | P57 |
|---|---|---|---|---|---|---|---|---|---|---|---|---|
| F13/v | F14/v | F15/v | F16/v | F17/v | F18/v | F19/v | F20/v | F21/v | F22/v | F23/v | F24/v | F25/v | F26/v | F27/v | F28/v |
| F12/v | F13/v | F14/v | F15/v | F16/v | F17/v | F18/v | F19/v | F20/v | F21/v | F22/v | F23/v | F24/v | F25/v | F26/v | F27/v |
| F11/v | F12/v | F13/v | F14/v | F15/v | F16/v | F17/v | F18/v | F19/v | F20/v | F21/v | F22/v | F23/v | F24/v | F25/v | F26/v |
| F10/v | F11/v | F12/v | F13/v | F14/v | F15/v | F16/v | F17/v | F18/v | F19/v | F20/v | F21/v | F22/v | F23/v | F24/v | F25/v |
| F9/v | F10/v | F11/v | F12/v | F13/v | F14/v | F15/v | F16/v | F17/v | F18/v | F19/v | F20/v | F21/v | F22/v | F23/v | F24/v |

FIG. 29A

|  | 0.078 | -0.137 | 0.094 |  |
|---|---|---|---|---|
| 0.396 | -0.375 | -0.000 | 0.107 | -0.166 |
| -0.506 | -1.579 | 0.047 | 1.095 | 1.471 |
| 0.375 | -0.384 | 0.053 | 0.073 | -0.159 |
|  | 0.051 | -0.058 | 0.030 |  |

|  | 0.031 | -0.105 | 0.088 |  |
|---|---|---|---|---|
| 0.476 | 0.653 | 0.088 | -0.962 | -0.030 |
| 0.610 | 0.588 | -0.023 | -0.999 | 0.045 |
|  | 0.047 | -0.107 | 0.071 |  |
|  |  | 0.022 |  |  |

FIG. 29B

|  | -0.023 | -0.014 | -0.043 |  |
|---|---|---|---|---|
| 0.175 | -0.221 | 0.150 | 0.553 | 0.918 |
| 0.239 | -1.135 | 0.267 | 0.708 | -0.102 |
| -0.102 | -1.052 | -0.073 | -0.152 | -0.124 |
|  | 0.603 | -0.247 | 0.182 |  |

|  | 0.159 | -0.026 | 0.222 |  |
|---|---|---|---|---|
| -0.162 | -0.155 | -0.283 | -1.492 | 0.008 |
| 0.465 | 1.498 | 0.355 | -0.572 | 0.284 |
|  | 0.327 | -0.141 | -0.049 |  |
|  |  | 0.051 |  |  |

IMAGE PROCESSING DEVICE THAT REMOVES MOTION BLUR FROM AN IMAGE AND METHOD OF REMOVING MOTION BLUR FROM AN IMAGE

TECHNICAL FIELD

The present invention relates to an image-processing apparatus, an image-processing method, and an image-processing program. More specifically, it detects shooting information from an image pick-up section, to detect a motion direction of an image in an overall screen based on a motion direction of the image pick-up section contained in the shooting information. It also sets a processing region of at least any one of a target image that corresponds to a target pixel in a predicted target image and a peripheral image of the target image and also sets a processing coefficient to remove a motion blur that corresponds to a detected motion direction, thereby creating a pixel value that corresponds to the target pixel based on a pixel value of a pixel in the processing region and the processing coefficient.

BACKGROUND ART

Conventionally, an event in a real world has been converted into data by using a sensor. The data acquired by using the sensor is information that is obtained by projecting information of the real world (e.g., light) onto a space and time having a lower number of dimensions than the real world. Accordingly, the information obtained by projection has distortion that occurs through projection. For example, in the case of imaging, by using a video camera, a moving object in front of a background at rest and converting it into data as an image signal, information of the real world is sampled and converted into data, so that an image which is displayed on the basis of the image signal encounters a motion blur that the moving object blurs as distortion that occurs through projection.

To solve this problem, as disclosed in Japanese Patent Application Publication No. 2001-250119 (Corresponding U.S. patent application Ser. No. 09/830,858, Corresponding EP Patent Application Publication No. EP1164545), for example, by detecting a profile of an image object that corresponds to an object in a foreground contained in an input image, the image object that corresponds to the object in the foreground is coarsely extracted to detect a motion vector of the image object corresponding to the object in the foreground that is coarsely extracted, so that the detected motion vector and its position information may be used to remove a motion blur.

DISCLOSURE OF THE INVENTION

As known, in motion blur removal processing, unless a motion vector is detected accurately, the motion blur cannot be removed accurately. Further, in the case of using also time-directional information to improve processing accuracy, if, for example, an exposure time is reduced less than one frame period by an operation of a shutter, a motion amount of an object and an amount of blurs of an input image do not always agree. Accordingly, unless an exposure time ratio, which is a percentage of an exposure time, is detected accurately, the blur amount of the input image cannot properly be detected, so that a motion blur cannot be removed accurately.

In this invention, thus, an image-processing apparatus, an image-processing method, and an image-processing program, which can perform the motion blur removal processing accurately, are provided.

An image-processing apparatus according to the invention comprises a shooting-information-detecting section that detects shooting information from an image pick-up section, a motion-detecting section that detects a motion direction of an image on an overall screen based on a motion direction of the image pick-up section contained in the shooting information, a processing-region-setting section that sets a processing region in at least any one of a predicted target image and a peripheral image thereof, which correspond to a target pixel in the predicted target image, a processing-coefficient-setting section that sets a motion-blur-removing-processing coefficient that corresponds to the motion direction, and a pixel-value-generating section that generates a pixel value that corresponds to the target pixel based on a pixel value of a pixel in the processing region and the processing coefficient.

An image-processing method according to the invention comprises a shooting information detection step of detecting shooting information from an image pick-up section, a motion detection step of detecting a motion direction of an image on an overall screen based on a motion direction of the image pick-up section contained in the shooting information, a processing-region-setting step of setting a processing region in at least any one of a predicted target image and a peripheral image thereof, which correspond to a target pixel in the predicted target image, a processing-coefficient-setting step of setting a motion-blur-removing-processing coefficient that corresponds to the motion direction, and a pixel-value-generation step of generating a pixel value that corresponds to the target pixel based on a pixel value of a pixel in the processing region and the processing coefficient.

An image-processing program according to the invention allows a computer to perform a shooting information detection step of detecting shooting information from an image pick-up section, a motion detection step of detecting a motion direction of an image on an overall screen based on a motion direction of the image pick-up section contained in the shooting information, a processing-region-setting step of setting a processing region in at least any one of a predicted target image and a peripheral image thereof, which correspond to a target pixel in the predicted target image, a processing-coefficient-setting step of setting a motion-blur-removing-processing coefficient that corresponds to the motion direction, and a pixel-value-generation step of generating a pixel value that corresponds to the target pixel based on a pixel value of a pixel in the processing region and the processing coefficient.

In the present invention, an exposure time, a motion of an image pick-up section, a gamma value, etc. are detected as shooting information, to perform inverse gamma processing on an image supplied from the image pick-up section based on a gamma value. Further, a motion vector of the image and an exposure time ratio are detected on the basis of the shooting information, to detect a motion blur amount based on the motion vector and the exposure time ratio. Based on the motion blur amount, a motion-blur-removing-processing coefficient is set. Moreover, an image obtained after the inverse gamma processing is used to set a processing region in at least any one of a target image and a peripheral image thereof, which correspond to a target pixel in a predicted target image, thereby generating a pixel value that corresponds to the target pixel from the motion-blur-removing-processing coefficient and a pixel value of a pixel in the processing region. The generated pixel value undergoes gamma processing based on the gamma value in the shooting information and then is output.

EFFECTS OF THE INVENTION

According to the present invention, the shooting information is detected from the image pick-up section, so that based on a motion direction of the image pick-up section contained in the shooting information, the motion direction of an image on an overall screen is detected. Further, the processing region is set in at least any one of a target image and the peripheral image thereof, which correspond to the target pixel in the predicted target image. Moreover, the motion-blur-removing-processing coefficient that corresponds to the motion direction is set, to generate a pixel value that corresponds to the target pixel based on the pixel value of the pixel in the processing region and the processing coefficient.

Thus, since the shooting information is detected from the image pick-up section and used to remove a motion blur, it is possible to construct a real world signal accurately. Further, by setting the processing region in the target image and/or the peripheral image thereof, any motion blur may be removed by use of time-directional information, thereby constructing a real world signal even more accurately.

Further, a size of the processing region is set in accordance with the motion blur amount, a direction of the processing region is set in accordance with the motion direction, and the processing coefficient is set in accordance with the motion blur amount, so that the motion blur can be removed in accordance with a motion of an image. Moreover, the motion blur is removed using an image that has undergone the inverse gamma processing based on the shooting information to perform the gamma processing on the generated pixel value and then output it, so that even if an image that has been undergone the gamma processing is output from the image pick-up section, the motion blur can be removed properly.

BRIEF DESCRIPTION OF THE DRAWINGS

FIG. 13 is an explanatory chart of operations for selecting a prediction tap discretely;

FIGS. 29A and 29B are diagrams each for showing processing coefficients with respect to each of the prediction taps.

BEST NODE FOR CARRYING OUT THE INVENTION

Figure 1:
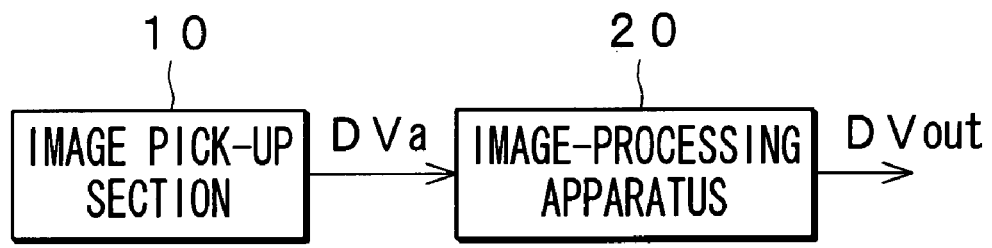
FIG. 1 is a diagram for showing a system configuration.

The following will describe embodiments of the present invention with reference to drawings. FIG. 1 is a block diagram for showing a configuration of a system to which the present invention is applied. An image pick-up section 10 generates an image signal DVa by picking up an image of a real society to supply it to an image-processing apparatus 20. The image-processing apparatus 20 extracts information embedded in the supplied image signal DVa of an input image to generate an image signal DVout from which the embedded information is extracted and outputs it. It is to be noted that the image-processing apparatus 20 is also configured so that it can extract the information embedded in the image signal DVa by using a variety of pieces of information ET supplied from an outside.

Figure 2:
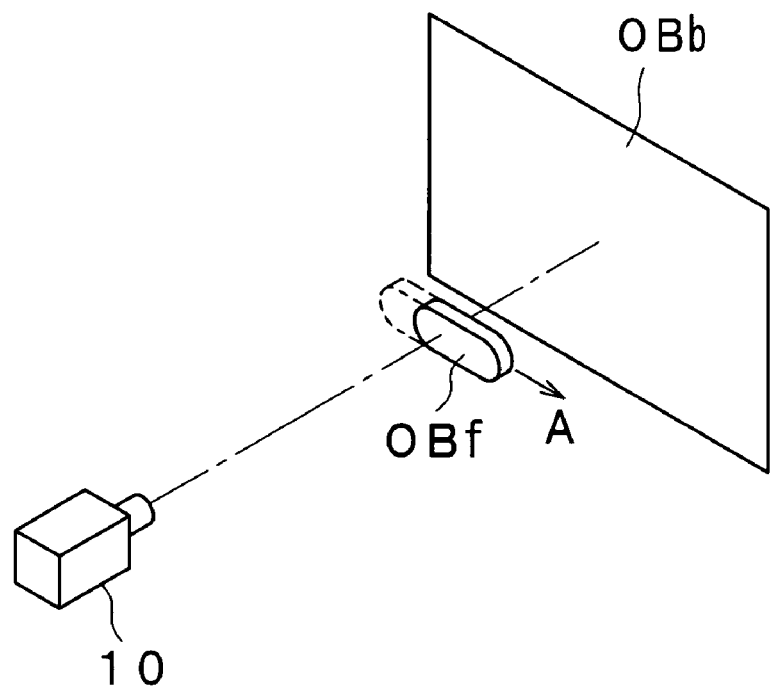
FIG. 2 is an illustration for explaining how an image pick-up section picks up an image.

The image pick-up section 10 is constituted of a video camera or the like that is equipped with a charge-coupled device (CCD) area sensor and an MOS area sensor, which are a solid-state image pick-up device, and picks up an image of a real society. For example, as shown in FIG. 2, when a moving object OBf that corresponds to a foreground is moving in a direction of an arrow A between the image pick-up section 10 and an object OBb that corresponds to a background, the image pick-up section 10 picks up an image of the moving object OBf that corresponds to the foreground together with an image of the object OBb that corresponds to the background.

A detection element in the image pick-up section 10 converts an input light into charges during a period of time corresponding to a period of exposure time and accumulates thus photo-electrically converted charges. A quantity of the charges is roughly proportional to an intensity of the input light and a period of time when the light is being input. During the period of time corresponding to the period of exposure time, the detection element adds charges converted from the input light to already accumulated charges. In other words, during the period of time corresponding to the period of exposure time, the detection element integrates the input light and accumulates a quantity of charges that corresponds to the integrated light. The detection element may be also said to have an integration effect on time. By, thus, performing photo-electric conversion by using the image sensor, the input light is converted into charges for each pixel, which are accumulated for each unit of the period of exposure time. A pixel signal is generated in accordance with the quantity of thus accumulated charges and then, by using this pixel signal, an image signal having a desired frame rate is generated, which is supplied to the image-processing apparatus. It is to be noted that the period of exposure time for the image sensor is a period of time when, as described above, the image sensor converts the input light into charges and accumulates them in the detection element and equal to an image time interval (e.g., a period of time for one frame) in a case where the shutter is not operated. It is also equal to a period of shutter-open time in a case where the shutter is operated.

Figure 3:
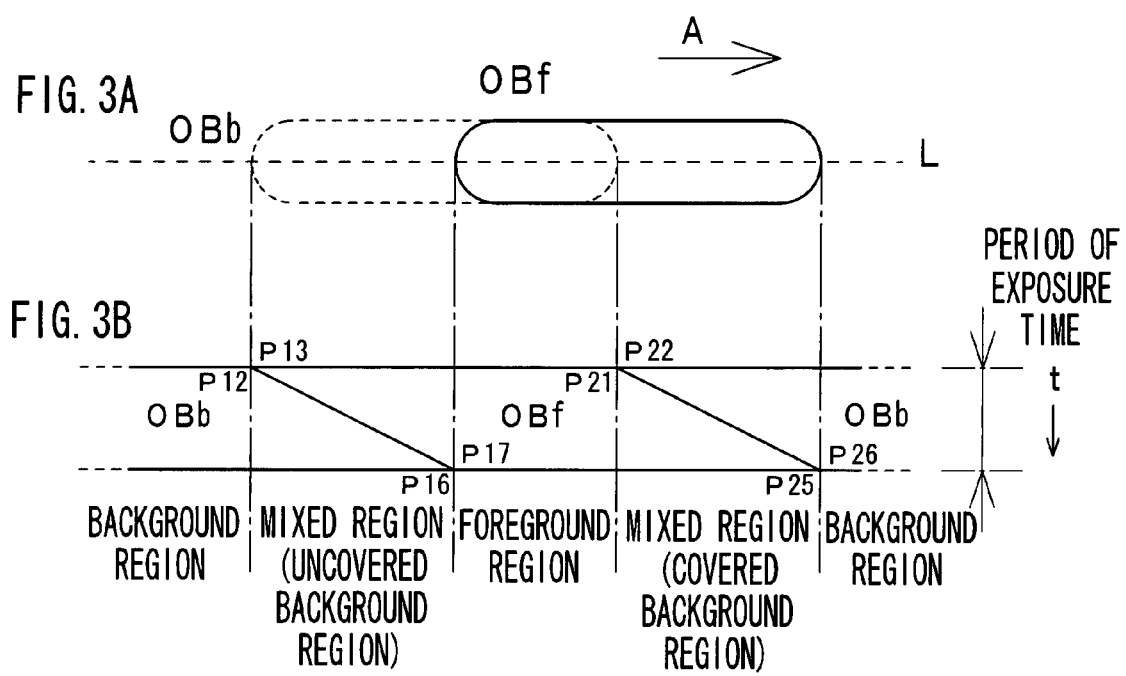
FIGS. 3A and 3B are diagrams each for explaining a picked up image.

FIGS. 3A and 3B are diagrams each for explaining a picked up image represented by an image signal. FIG. 3A shows an image obtained by picking up an image of a moving object OBf that corresponds to the moving foreground and an image of an object OBb that corresponds to the still background. It is to be noted that the moving object OBf that corresponds to the foreground is supposed to be moving horizontally in a direction of an arrow A.

FIG. 3B shows a relationship between the image and time at a position on line L, which is indicated by broken lines, extending in the direction of the arrow A as shown in FIG. 3A. If a length of the moving object OBf in its motion direction on the line L is, for example, nine pixels and the moving object OBf moves as much as five pixels in one period of exposure time, its front end and rear end that have stayed at pixel positions P21 and P13 at the beginning of a period of frame period move to pixel positions P25 and P17 at the end of the period of exposure time, respectively. Further, if the shutter is not operated, a period of exposure time for one frame is equal to one period of frame time, so that the front end and the rear end moves to pixel positions P26 and P18 respectively at the beginning of the next period of frame time.

Accordingly, in the period of frame time on the line L, a portion up to pixel position P12 and a portion from pixel position P26 each provide a background region that is constituted of a background component only. A portion between the pixels positions P17 and P21 provides a foreground region constituted of a foreground component only. A portion between the pixel positions P13 and P16 and a portion between the pixel positions P22 and P25 each provide a mixed region in which a foreground component and a background component are mixed. The mixed regions are classified into a covered background region in which a background component is covered by a foreground as time elapses and an uncovered background region in which a background component appears as time elapses. It is to be noted that in FIG. 3B, a mixed region positioned on the front end side of the foreground object OBf in its traveling direction provides a covered background region and a mixed region positioned on its rear end side in its traveling direction provides an uncovered background region. Thus, an image signal contains an image that includes a foreground region, background regions, or a covered background region or an uncovered background region.

Figure 4:
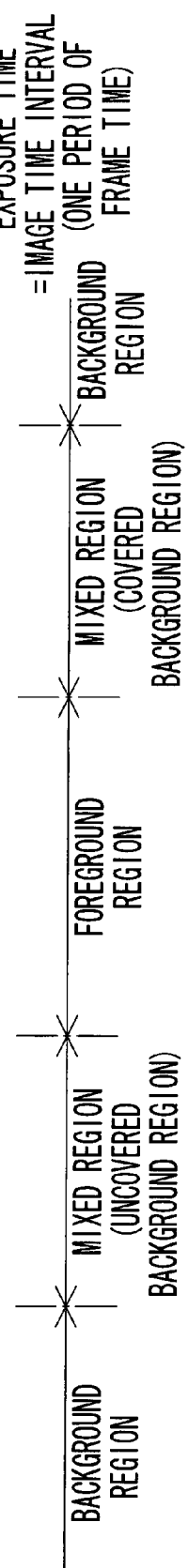
FIG. 4 is an explanatory chart of operations for dividing pixel values in a time direction.

Herein, on the assumption that an image time interval is short and that the moving object OBf that corresponds to the foreground is a rigid body and moves with uniform speed, operations for dividing pixel values on the line L time-directionally is performed as shown in FIG. 4. In these operations for time-directional division, a pixel value is developed in the time direction and divided by a virtual divisor into equal time intervals. It is to be noted that in FIG. 4, a vertical axis represents time, to indicate that time elapses downward in the figure.

The virtual divisor is set to one corresponding to a motion amount v of a moving object in an image time interval. For example, if the motion amount v in one period of frame time corresponds to five pixels as described above, the virtual divisor is set to "5" corresponding to the motion amount v, to divide one period of frame time into five equal time intervals.

Further, pixel values, during one period of frame time, of pixel position Px obtained when the object OBb that corresponds to the background is picked up are supposed to be Bx and pixel values obtained at the pixels when the moving object OBf having a nine-pixel length on the line L, which corresponds to the foreground, is picked up with it being at rest are supposed to be F09 (on the front end side) through F01 (on the rear end side).

In this case, for example, pixel value $DP_{14}$ at pixel position P14 is given by Equation 1:

$$DP_{14} = B14/v + B14/v + B14/v + F01/v + F02/v \qquad (1)$$

At this pixel position P14, three virtual time dividends (a period of frame time/v) of the background component and two virtual time dividends of the foreground component are contained and so, a mixture ratio α of the background component with respect to the pixel values is 3/5. Similarly, for example, at pixel position P22, one virtual time dividend of the background component and four virtual time dividends of the foreground component are contained and so, a mixture ratio α therewith is 1/5.

Figure 5:
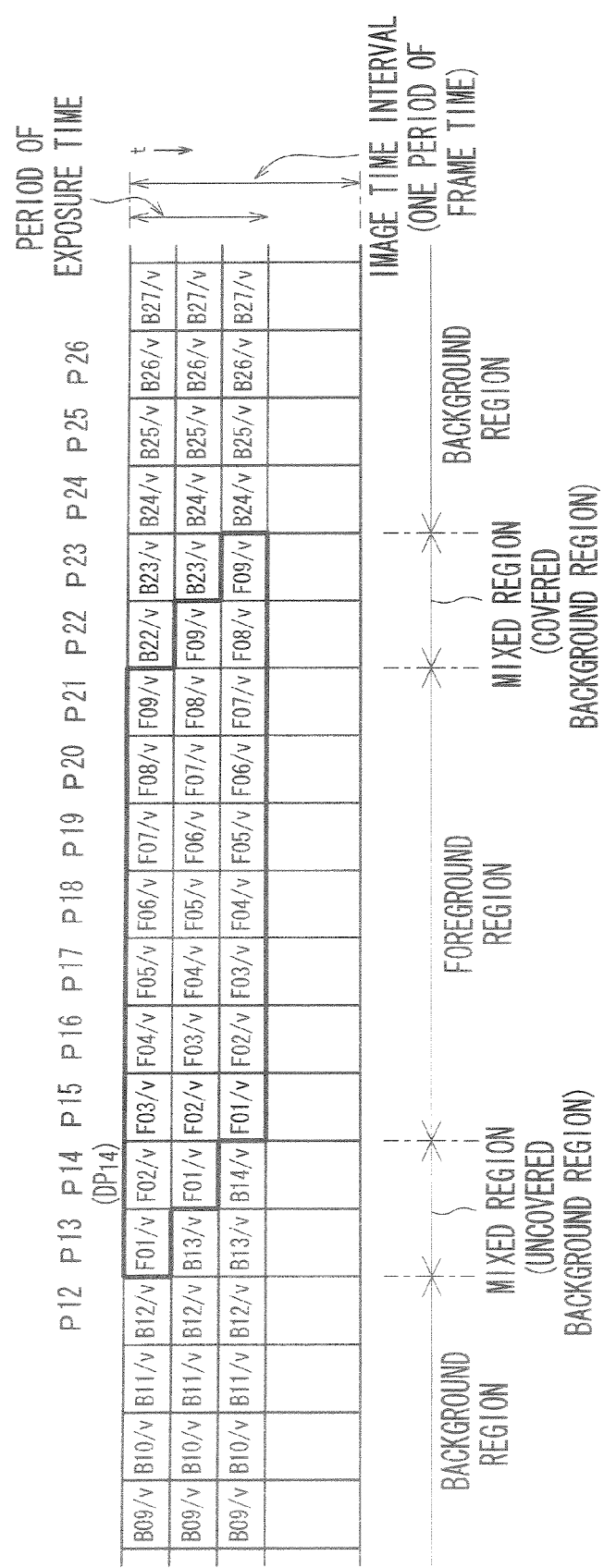
FIG. 5 is an explanatory chart of operations for dividing pixel values in a time direction when a shutter is operated.

Further, if the shutter is operated to change an exposure time ratio indicative of a ratio of a period of exposure time with respect to one period of frame time, for example, if the exposure time ratio is changed to 3/5, as shown in FIG. 5, operations to divide pixel values time-directionally in one period of frame time are performed, so that the pixel values can be divided by a virtual divisor in accordance with the exposure time ratio into equal time intervals.

The virtual divisor is set to one corresponding to, for example, a motion amount v of a moving object in a pixel time interval. For example, if the motion amount v in one period of frame time is as long as five pixels as described above, the virtual divisor is set to "5" corresponding to the motion amount v, to divide one period of frame time into five equal time intervals.

In this case, for example, pixel value $DP_{14}$ at pixel position P14 is given by Equation 2:

$$DP_{14} = B14/v + F01/V + F02/v \qquad (2)$$

At this pixel position P14, one virtual time dividend (a period of frame time/v) of the background component and two virtual time dividends of the foreground component are contained and so, a mixture ratio α is 1/3. Similarly, for example, at pixel position P22, one virtual time dividend of the background component and two virtual time dividends of the foreground component are contained and so, a mixture ratio α is 1/3.

If the shutter is operated, by multiplying an exposure time ratio and a motion amount v in one period of frame time, the motion amount vs in a period of exposure time can be calculated.

Thus, since foreground components move, different foreground components are added within one period of exposure time, so that a foreground region corresponding to a moving object contains a motion blur. Accordingly, the image-processing apparatus 20 extracts significant information that has been embedded in an image signal, to generate the image signal DVout in which the motion blur of the moving object OBf that corresponds to the foreground is mitigated.

Figure 6:
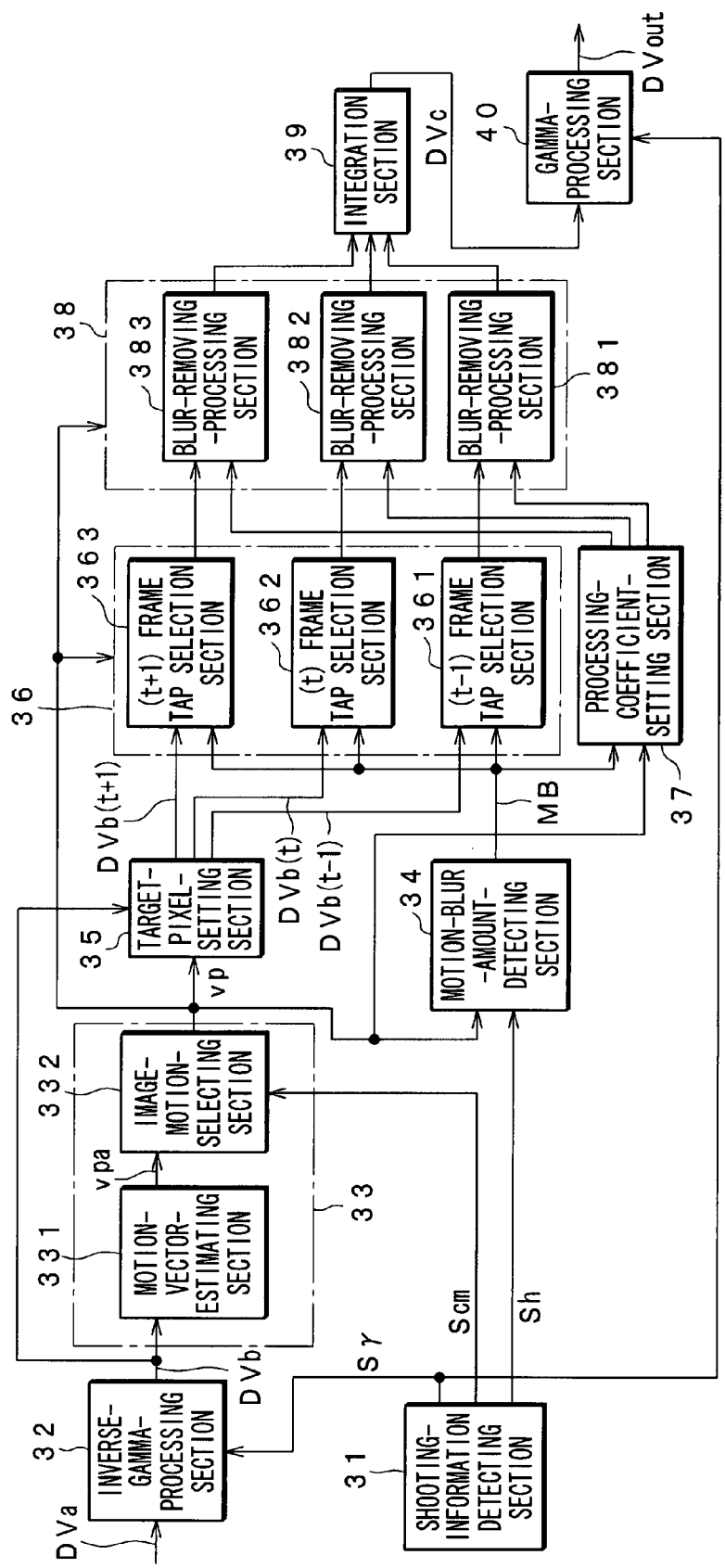
FIG. 6 is a functional block diagram of an image-processing apparatus.

FIG. 6 is a functional block diagram of the image-processing apparatus. It is to be noted that functions of the image-processing apparatus may be realized by hardware or software, whichever available. In other words, the function blocks of FIG. 6 may be realized by either hardware or software.

Figure 7:
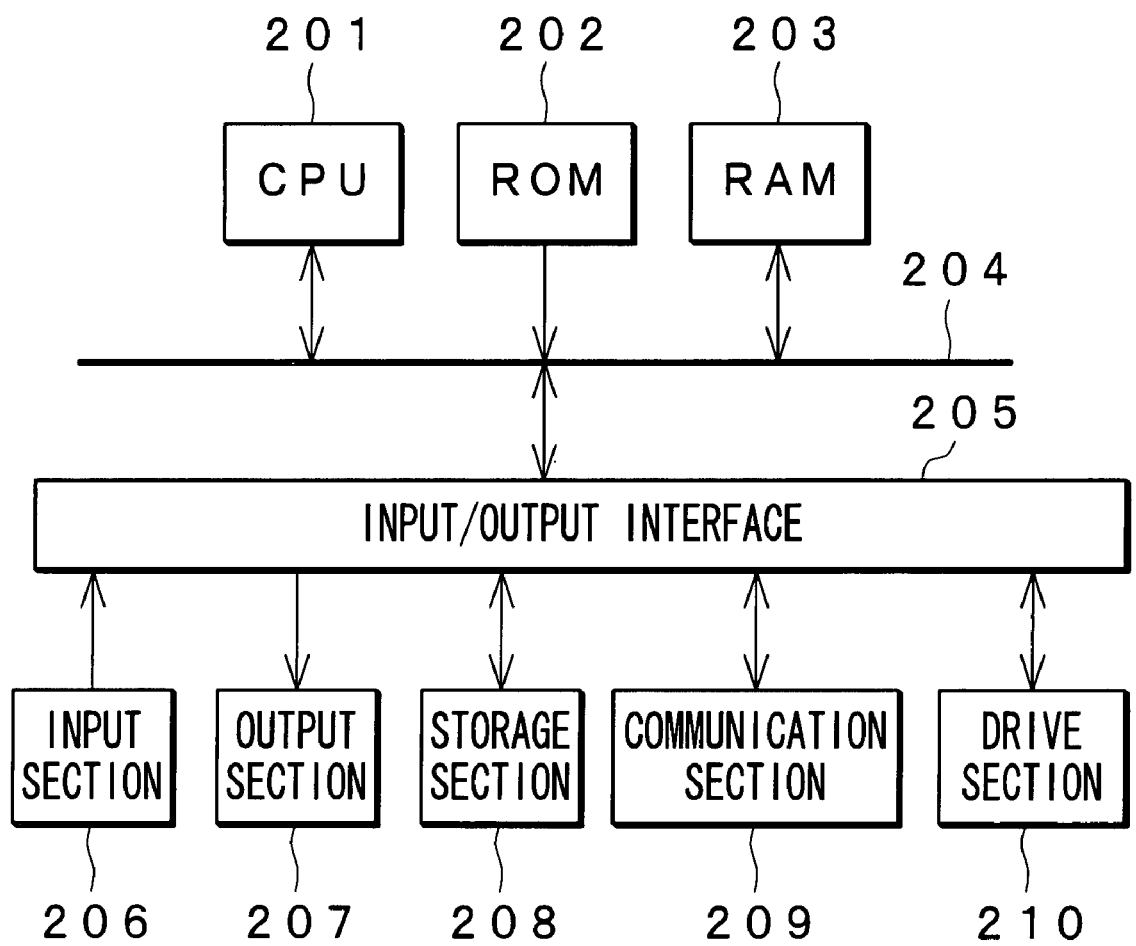
FIG. 7 is a diagram for showing a configuration of the image-processing apparatus in a case where software is used.

A configuration of the image-processing apparatus 20 in use of the software is shown in, for example, FIG. 7. A central processing unit (CPU) 201 performs various kinds of processing in accordance with programs stored in a read only memory (ROM) 202 or a storage section 208, and the programs to realize the functions of the image-processing apparatus are stored in the ROM 202 and the storage section 208. A random access memory (RAM) 203 appropriately stores a program or data which is executed by the CPU 201. The CPU 201, the ROM 202, and the RAM 203 are connected to each other via a bus 204.

To the CPU 201, an input/output interface 205 is further connected via the bus 204. An input section 206 constituted of a keyboard, a mouse, or a microphone and an output section 207 constituted of a display or a speaker are connected to the input/output interface 205. The CPU 201 performs various kinds of processing in accordance with commands input from the input section 206. Then, the CPU 201 provides the output section 207 with an image, a voice, etc. obtained as a result of the processing.

The storage section 208 connected to the input/output interface 205 is constituted of, for example, a hard disk, to store programs and various kinds of data to be run by the CPU 201. A communication section 209 communicates with an external apparatus via the Internet or any other network. In this example, the communication section 209 serves as an acquisition section that takes in an output of the sensor. It may also acquire programs via the communication section 209 and store them in the storage section 208.

A dive section 210 connected to the input/output interface 205, if mounted with a storage medium such as a magnetic disk, an optical disk, a magnetic optical disk, or a semiconductor memory, dives them to acquire program or data stored in them. The acquired programs and data are transferred to the storage section 208 and stored in it as necessary.

As shown in FIG. 6, a shooting-information-detecting section 31 in the image-processing apparatus 20 detects shooting information at the time when the image signal DVa is generated by the image pick-up section 10. As the shooting information, information (exposure time information) Sh that indicates a period of exposure time (shutter speed) detected when the shutter is operated with the image pick-up section 10 is given to the shooting information. If gamma processing is performed when an image signal is generated in the image pick-up section 10, a gamma value used in the gamma processing is detected to give information (gamma value information) $S\gamma$ indicative of the detected gamma value as the shooting information. If a direction of picking up the image by the image pick-up section 10 is shifted by hand, for example, the image pick-up section 10 is equipped with an angular speed sensor or a three-dimensional acceleration sensor which uses a magnetic sensor or a three-dimensional gyroscope, to detect a motion of the image pick-up section 10 based on a sensor signal from the sensor equipped to the image pick-up section 10 so that information (image pick-up section's motion information) Scm indicative of detected motion of the image pick-up section is given as the shooting information. Further, if the direction of picking up the image by the image pick-up section 10 is remote-controlled, it is also possible to generate the image pick-up section's motion information Scm based on a control signal supplied from the outside. The shooting-information-detecting section 31 supplies the generated gamma value information $S\gamma$ to an inverse-gamma-processing section 32 and a gamma-processing section 40, the exposure time information Sh to a motion-blur-amount-detecting section 34, and the image pick-up section's motion information Scm to a motion-detecting section 33.

The inverse-gamma-processing section 32 performs inverse gamma processing based on the gamma value information $S\gamma$ supplied from the shooting-information-detecting section 31 on an image signal DVa supplied from the image pick-up section 10. In this case, if input/output characteristics of a display device (e.g., cathode ray tube) for displaying an image by using the generated image signal DVa are nonlinear characteristics, the image pick-up section 10 performs gamma processing, by offsetting the nonlinear characteristics beforehand, so that overall characteristics ranging from the image pick-up section 10 to the display device may become linear. Therefore, the image signal DVa supplied from the image pick-up section 10 is corrected so as to offset the nonlinear characteristics, so that inverse gamma processing is performed on the image signal DVa based on a gamma value used in this correction to thereby generate a pre-gamma processing image signal DVb. The image signal DVb has linear characteristics with respect to an image of a real world, so that, by removing motion blurs by using this image signal DVb, it is possible to estimate an image of the real world more accurately.

A motion-vector-estimating section 331 in the motion-detecting section 33 estimates a motion direction or a motion vector on an overall screen based on the image signal DVb and supplies it as image motion information vpa to an image-motion-selecting section 332. The motion-vector-estimating section 331 uses a method such as a block matching method or a gradient method to obtain a motion direction or a motion vector for each pixel, thereby giving a most frequent motion direction or motion vector as the motion direction or the motion vector on the overall screen.

The image-motion-selecting section 332 generates image motion information vpb indicative of a motion of an image on an overall screen based on image pick-up section's motion information Scm supplied from the shooting-information-detecting section 31. It is to be noted that the image pick-up section's motion information Scm indicates a motion of the image pick-up section 10 and the image shifts in a direction opposite to motion direction of the image pick-up section 10, so that it is possible to determine a motion direction in the image motion information vpb by assuming that a motion direction in the image pick-up section's motion information Scm is opposite. Further, it is possible to determine a motion amount in the image motion information vpb based on a motion amount in the image pick-up section's motion information Scm and a field angle of the image pick-up section 10. The image-motion-selecting section 332 selects any one from the image motion information vpa and the image motion information vpb and supplies it as image motion information vp to the motion-blur-amount-detecting section 34, a target-pixel-setting section 35, a processing-region-setting section 36, and a pixel-value-generating section 38. Selection of the image motion information vpa or vpb may be executed by a user or automatically by the image-processing apparatus 20. Further, by executing selection of the image motion information vpa or vpb in accordance with a picked-up image, it is possible to improve any detection accuracy on a motion of an image on an overall screen, thereby removing motion blurs well. For example, if the image signal DVa is generated by picking up only a still subject with a direction of picking up the image by the image pick-up section 10 being shifted, the image motion information vpb can be selected to thereby detect a motion on an overall screen accurately.

Moreover, the image-motion-selecting section 332 can select image motion information for each pixel also. For example, if a moving subject and a still subject are mixed and the still subject is larger than the other, the image motion information vpb is selected at a pixel position where an occurrence frequency is high of a motion direction or motion vector estimated by the motion-vector-estimating section 331 and the image motion information vpa is selected at a pixel position where the occurrence frequency thereof is not high. In this case, a motion of an image portion of the still subject can be obtained accurately.

By, thus, selecting any one from the image motion information vpa and the image motion information vpb for one image, the image-motion-selecting section 332 detects a motion on an overall screen. Further, if the image motion information vpa or vpb is selected for each pixel, a motion can be detected also for each pixel.

The motion-blur-amount-detecting section 34 detects an exposure time ratio serving as a ratio of a period of exposure time with respect to an image interval based on the exposure time information Sh from the shooting-information-detecting section 31, performs multiplication processing by using the exposure time ratio and the image motion information vp supplied from the motion-detecting section 33 to thereby detect a motion blur amount MB in the period of exposure time for each pixel, and supplies it to the processing-region-setting section 36 and a processing-coefficient-setting section 37.

The target-pixel-setting section 35 sets a plurality of images to be processed, which include a target image, detects pixels on the images to be processed corresponding to a target pixel in the target image based on the image motion information vp set by the motion-detecting section 33, and sets the detected pixels as a target pixel in each of the images to be processed. It further supplies the processing-region-setting section 36 with image signals of the plurality of images to be processed in each of which the target pixel is set. Herein, the target image refers to as an image in which motion-blur-removing processing is executed among input images supplied to the image-processing apparatus 20, and the target pixel refers to as a pixel in which the motion-blur-removing processing is executed in the target image.

For example, if supposing an image of a (t) frame to be a target image, images of (t−1), (t), and (t+1) frames are set to images to be processed. In this case, based on the image motion information vp, pixels on images of the (t−1) frame and (t+1) frame corresponding to the target pixel in the target image are set as target pixels. Moreover, an image signal DVb(t) on image to be processed in the (t) frame is supplied to a (t) frame tap selection section 362 of the processing-region-setting section 36; an image signal DVb(t−1) on image to be processed in the (t−1) frame in which the target pixel is set is supplied to a (t−1) frame tap selection section 361; and an image signal DVb(t+1) on image to be processed in the (t+1) frame in which the target pixel is set is supplied to a (t+1) frame tap selection section 363, respectively.

It to be noted that if the target pixel in the target image is moved by the image motion information vp in the (t+1) frame, by moving an image of the (t+1) frame back by the image motion information vp, a position of the target pixel in the target image agrees with that of target pixel in the post-movement (t+1) frame, thereby enabling processing regions to be easily set in the processing-region-setting section 36.

Further, a reference target image is not limited to an image of the (t) frame but may be an image of the (t−1) or (t+1) frame. Moreover, with reference to setting any pixel in the target image as a target pixel, the target pixel is specified from the outside or pixels in the target image are sequentially specified automatically as the target pixel. This enables motion-blur-removing processing to be performed only on a desired pixel or to be automatically performed on an entirety of the target image. Further, by specifying a range from the outside and sequentially specifying pixels in the range as the target pixel automatically, it is possible to perform motion-blur-removing processing on a desired range.

The processing-region-setting section 36 sets processing regions in at least any one of a predicted target image and a peripheral image that corresponds to a target pixel in the target image. It is to be noted that FIG. 6 shows a case where processing regions are set for a total of three frames of motion images including a target image and peripheral images thereof. Further, as described later, if they concern still images, processing regions are set for a target image, which is the still image.

Figure 8:
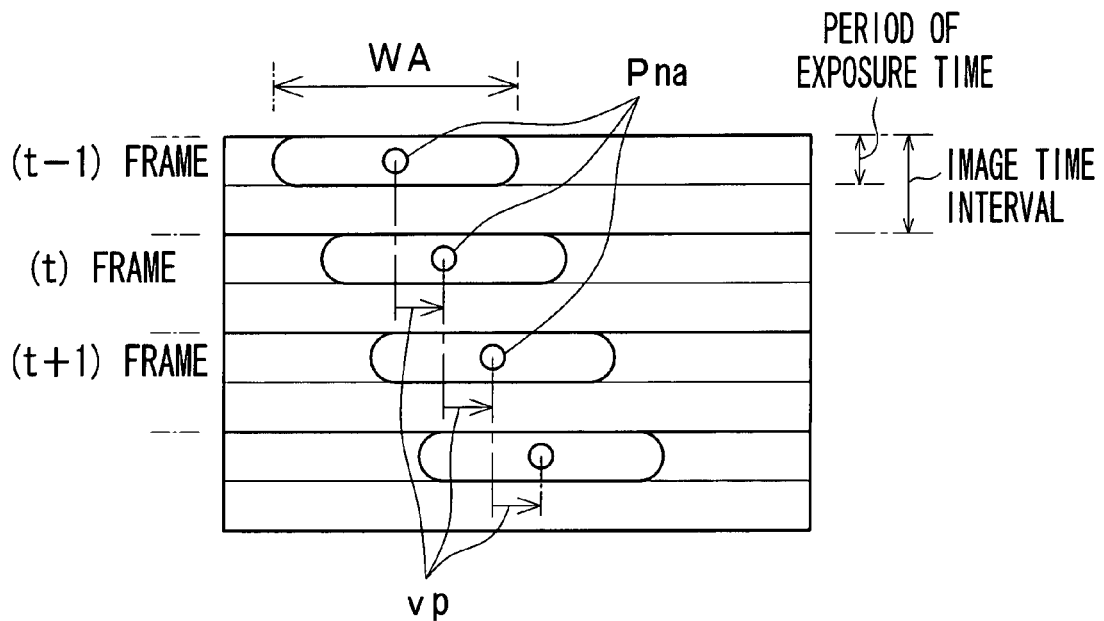
FIG. 8 is a diagram for explaining a processing region.

The (t−1) frame tap selection section 361 in the processing-region-setting section 36 sets a processing region having a space-directional size that corresponds to, for example, a motion blur amount MB set by the motion-blur-amount-detecting section 34, on the basis of a target pixel in an image to be processed, which is supplied from the target-pixel-setting section 35. Alternatively, it sets a processing region having a size that corresponds to a motion blur amount MB set by the motion-blur-amount-detecting section 34, in a motion direction indicated by the image motion information vp supplied from the motion-detecting section 33. Moreover, it supplies pixel values in the processing region to a blur-removing-processing section 381 in the pixel-value-generating section 38. FIG. 8 shows processing regions, in which processing regions WA are set in the images to be processed on the basis of a target pixel Pna indicated by a circle in the figure. As in the case of the (t−1) frame tap selection section 361, the (t) frame tap selection section 362 and the (t+1) frame tap selection section 363 also set processing regions, respectively, in accordance with the motion blur amount MB set in the motion-blur-amount-detecting section 34, on the basis of the target pixel Pna in each of the images to be processed supplied from the target-pixel-setting section 35. Moreover, they supply pixel values in the processing regions to blur-removing-processing sections 382 and 383, respectively.

The processing-coefficient-setting section 37 is constituted of a memory, in which processing coefficients corresponding to motion blur amounts or the motion blur amounts and motion directions are stored beforehand. If storing specific processing coefficients which are generated corresponding to motion blur amounts by setting motion directions to any specific directions, the processing-coefficient-setting section 37 reads out of the memory the processing coefficients that correspond to the motion blur amounts MB supplied from the motion-blur-amount-detecting section 34 and supplies them to the blur-removing-processing sections 381, 382, and 383, thereby setting the processing coefficients. Further, if storing processing coefficients that correspond to motion blur amounts and motion directions, the processing-coefficient-setting section 37 reads out of the memory processing coefficients that correspond to the motion blur amount MB supplied from the motion-blur-amount-detecting section 34 and a motion direction indicated by the image motion information vp supplied from the motion-detecting section 33 and supplies them to the blur-removing-processing sections 381, 382, and 383, thereby setting the processing coefficients. Further, if receiving any adjustment information, not shown, that enables adjustment of a motion blur from the outside, the processing-coefficient-setting section 37 may switch processing coefficients to be supplied to the pixel-value-generating section 38 based on the adjustment information, thereby enabling adjustment of motion-blur-removing effects. In this case, even if, for example, a motion blur cannot optimally be removed by means of a processing coefficient supplied first, by switching the processing coefficient to another, the motion blur can be removed optimally. Further, by switching the processing coefficients, a motion blur can be left intentionally.

The blur-removing-processing section 381 in the pixel-value-generating section 38 performs linear combination using the pixel values in the processing region supplied from the (t−1) frame tap selection section 361 and the processing coefficients supplied from the processing-coefficient-setting section 37 to thereby generate a pixel value after the blur-removing processing is performed and supplies it to an integration section 39. In this case, if receiving specific processing coefficients that correspond to motion blur amounts from the processing-coefficient-setting section 37, the blur-removing-processing section 381 generates new pixel values for processing from the pixel values in the processing region supplied from the (t−1) frame tap selection section 361 and image motion information vp, and calculates multiply and accumulation of the generated pixel values for processing and the specific processing coefficients, thereby generating a pixel value.

Figure 9:
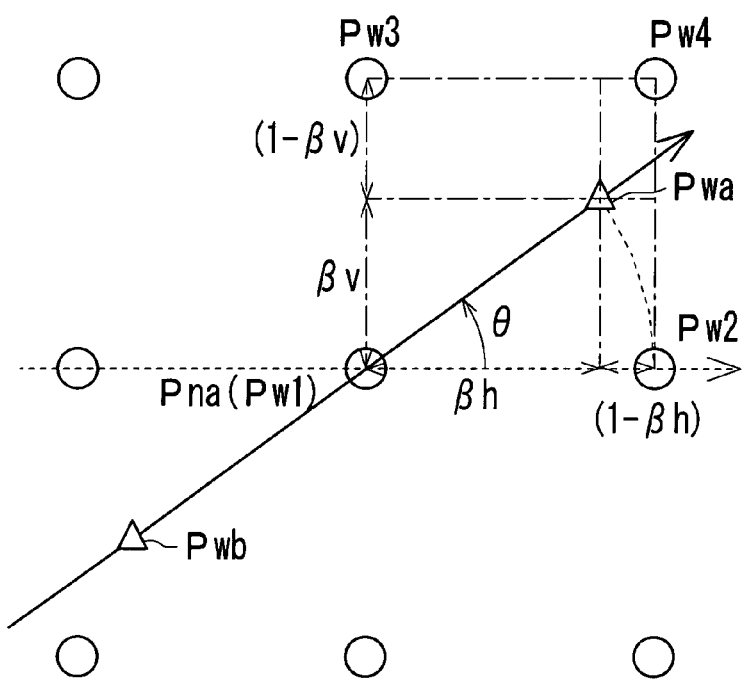
FIG. 9 is a diagram for explaining a method of calculating a pixel value.

Herein, the pixel values for processing will be generated as follows. In other words, when processing coefficients to be used in blur-removing processing are generated, a motion direction is set to a specific direction and processing coefficients thus obtained are stored as specific processing coefficients in the processing-coefficient-setting section 37. In the blur-removing-processing section 381 of the pixel-value-generating section 38, if a motion direction indicated by the image motion information vp has an angle difference of θ with respect to the specific direction at the time when the processing coefficients have been generated, namely, if as shown in FIG. 9, for example, the motion direction set when the processing coefficients have been generated is horizontal and the motion direction indicated by the image motion information vp has an angle difference of θ, pixel positions corresponding to the processing coefficients in the motion direction indicated by the image motion information vp from a target pixel Pna are pixel positions Pwa and Pwb, which are indicated by triangles. Accordingly, a pixel value DPw of position Pwa is calculated by Equation 3 using pixel values of peripheral pixel positions Pw1, Pw2, Pw3, and Pw4. Further, similarly, a pixel value DPwb of position Pwb that is opposite to the position Pwa is calculated. Thus, the (t−1) frame tap selection section 361 sets a processing region so that pixel values for processing can be generated.

$$DPwa = (1 - \beta h) \times (1 - \beta v) \times DPw1 + \qquad (3)$$
$$\beta h \times (1 - \beta v) \times DPw2 +$$
$$(1 - \beta h) \times \beta v \times DPw3 +$$
$$\beta h \times \beta v \times DPw4$$

where $\beta h = \cos \theta$, $\beta v = \sin \theta$, DPw1 is a pixel value of pixel position Pw1, and DPw2 to DPw4 are pixel values of pixel positions Pw2 to Pw4, respectively.

Further, if receiving processing coefficients that correspond to motion blur amounts and motion directions, the blur-removing-processing section 381 calculates multiply and accumulation of the pixel values in the processing region set in the (t−1) frame tap selection section 361 corresponding to the motion blur amounts and the motion directions and the processing coefficients supplied from the processing-coefficient-setting section 37, thereby generating a pixel value.

The blur-removing-processing section 381 calculates multiply and accumulation of pixel values thus calculated as the pixel values for processing and processing coefficients supplied from the processing-coefficient-setting section 37, thereby generating a pixel value.

As in the case of the blur-removing-processing section 381, the blur-removing-processing section 382 performs linear combination using pixel values in a processing region supplied from the (t) frame tap selection section 362 and processing coefficients supplied from the processing-coefficient-setting section 37 to thereby generate a pixel value after blur-removing processing is performed and supplies it to the integration section 39. The blur-removing-processing section 383 performs linear combination using pixel values in a processing region supplied from the (t+1) frame tap selection section 363 and processing coefficients supplied from the processing-coefficient-setting section 37 to thereby generate a pixel value after blur-removing processing is performed and supplies it to the integration section 39.

Equation 4 indicates a case of calculating multiply and accumulation as one example of linear combination of pixel values in a processing region and processing coefficients.

$$q' = \sum_{i=0}^{n} di \times ci \qquad (4)$$

In the Equation 4, q' indicates a pixel value of a pixel from which blur is removed. ci (i is an integer of 1 through n, indicating each of the pixels in a processing range) represents pixel values in the processing region. Further, di indicates processing coefficients.

The integration section 39 integrates the blur-removed pixel values supplied from the blur-removing-processing sections 381 to 383 to thereby generate a pixel value of a target pixel in a prediction image, which is an image whose motion blurs have been removed, and outputs it as an image signal DVout. In the integration of the pixel values, statistical processing is assumed to be used. For example, a simple averaging method, a weighted averaging method, and a median filter method, etc. can be employed. By the weighted averaging method, an average value is calculated by weighting, for example, 2:6:2 to pixel values of the (t−1) frame: pixel values of the (t) frame: pixel values of the (t+1) frame.

The gamma-processing section 40 performs gamma processing on the image signal DVc supplied from the integration section 39 by using the gamma value information Sγ supplied from the shooting-information-detecting section 31 and outputs it as an image signal DVc.

Figure 10:
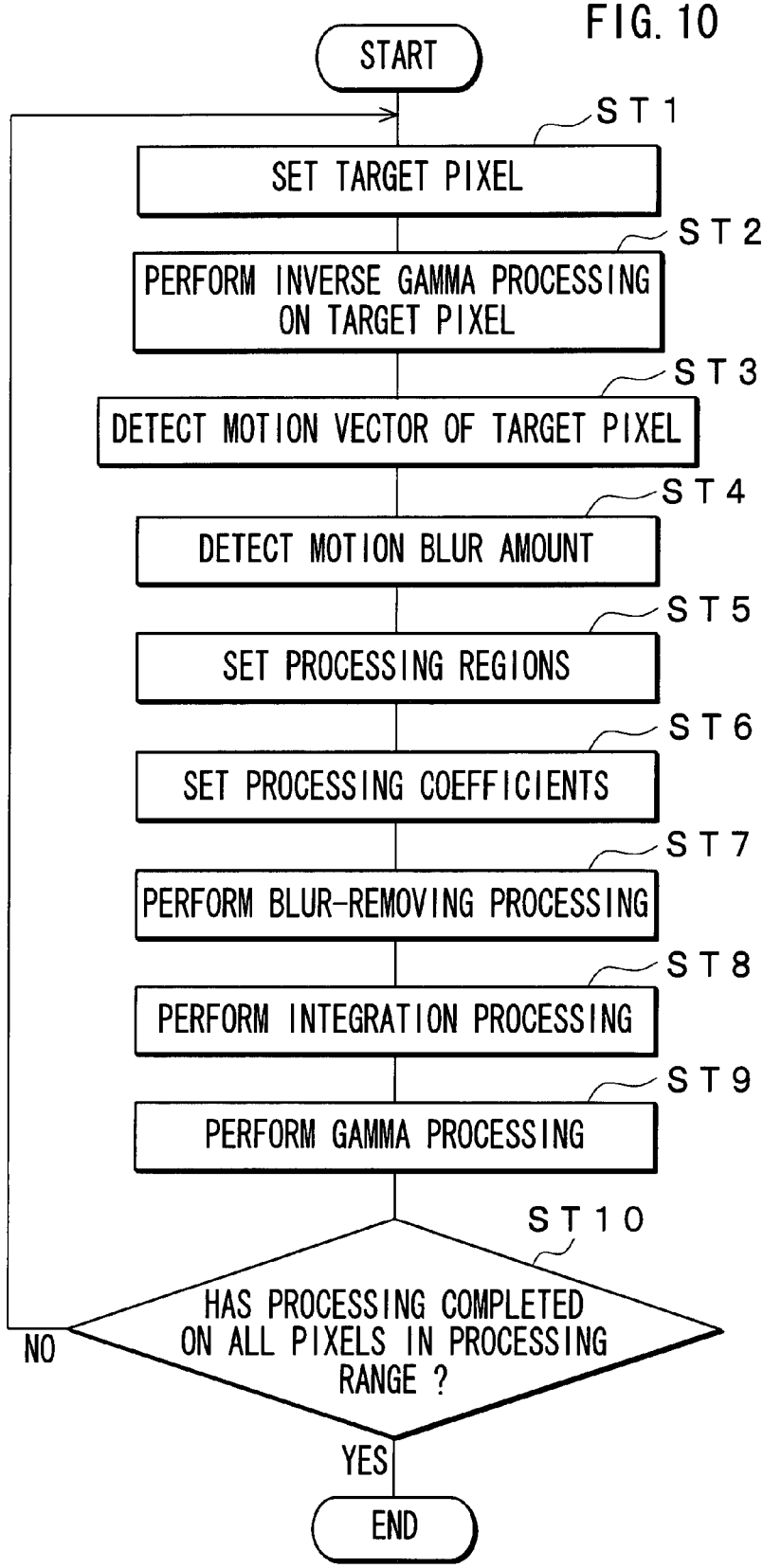
FIG. 10 is a flowchart for showing image-processing.

FIG. 10 shows a flowchart in the case of performing image-processing by using software. At step ST1, the CPU 201 sets a target pixel, from which motion blur is to be removed, in a target image and proceeds to step ST2. At the step ST2, the CPU 201 performs inverse gamma processing on the target pixel based on a gamma value indicated by shooting information, to generate an image signal at the time when an image of a real world is projected. At step ST3, the CPU 201 detects a motion vector of the target pixel and proceeds to step ST4. At the step ST4, the CPU 201 detects a motion blur amount of the target pixel. In other words, it detects the motion blur amount of the target pixel in a period of exposure time based on the motion vector detected at step ST3 and exposure time information indicated by the shooting information.

At step ST5, the CPU 201 sets processing regions. In other words, the CPU 201 sets images to be processed based on the target pixel in the target image and sets target pixels in the images to be processed. Moreover, by using as a reference the target pixels in the images to be processed, it sets processing regions that correspond to the motion blur amount obtained at the step ST4 or processing regions that correspond to a motion direction corresponding to the motion vector detected at the step ST3 and the motion blur amount obtained at the step ST4, and then proceeds to step ST6.

At the step ST6, the CPU 201 sets processing coefficients and proceeds to step ST7. In this processing coefficient setting, it sets specific processing coefficients based on the motion blur amount of the target pixel obtained at the step ST4 or processing coefficients based on the motion blur amount of the target pixel obtained at the step ST4 and the motion direction corresponding to the motion vector detected at the step ST3.

At the step ST7, the CPU 201 performs blur-removing processing on the images to be processed by using the processing coefficients set at the step ST6. In other words, the CPU 201 generates pixel values that correspond to the target pixels based on the pixel values in the processing regions set at the step ST5 and the processing coefficients set at the step ST6 corresponding to the motion amounts and the motion directions. Alternatively, it generates new pixel values for processing from the pixel values in the processing regions and calculates pixel values that correspond to the target pixels based on these pixel values for processing and the specific processing coefficients set at the step ST6 corresponding to the motion amounts. In such a manner, it calculates a pixel value, from which the blur is removed, for each target pixel in each of the images to be processed and then proceeds to step ST8.

At the step ST8, the CPU 201 performs integration processing on the pixel values calculated at the step ST7 for each image to be processed and outputs an obtained pixel value as a pixel value of the target pixel after motion blur removing is processed, and then it proceeds to step ST9. At the step ST9, the CPU 201 performs gamma processing on the target pixel by using the gamma value indicated by the shooting information and outputs a gamma-processed pixel value as the image signal DVout.

At step ST10, the CPU 201 decides whether blur-removing processing has completed on all pixels in the processing ranges and, if any one of the pixels is not undergone yet the blur-removing processing, it returns to the step ST1 while if blur removing has completed on all pixels in the processing ranges, it ends the image processing on the target image.

By thus detecting the shooting information and performing motion-blur-removing processing on a target pixel using the detected shooting information, it is possible to improve a processing accuracy of the motion-blur-removing processing.

The following will describe cases of obtaining through learning processing coefficients to be stored beforehand in the processing-coefficient-setting section 37 to perform blur-removing processing thereon and obtaining the processing coefficients from model equations to perform the blur-removing processing thereon.

Figure 11:
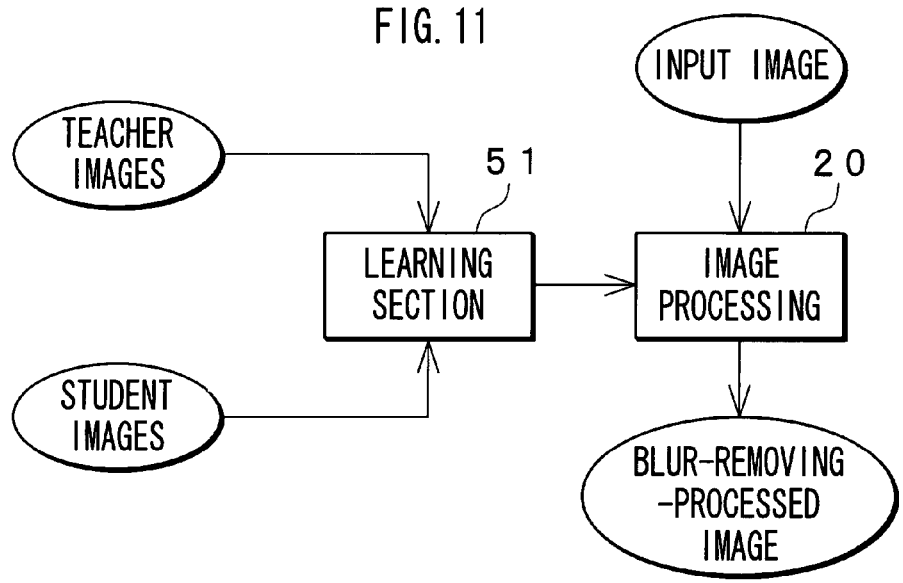
FIG. 11 is a diagram for showing a configuration in a case where blur-removing processing is performed by obtaining processing coefficients through learning.

FIG. 11 shows a configuration in a case where the blur-removing processing is performed by obtaining the processing coefficients through learning. A learning section 51 performs learning processing by using still images serving as teacher images and student images obtained by adding any motion blurs to each of the still image and stores processing coefficients obtained by this learning into the processing-coefficient-setting section 37 in the image-processing apparatus 20. The image-processing apparatus 20 sets processing regions corresponding to target pixels from an image containing a motion blur as an input image as described above and performs calculation processing by using pixel values in the processing regions and processing coefficients corresponding to the motion blur amount, which are stored in the processing-coefficient-setting section 37, thereby generating blur-removed pixel values.

Figure 12:
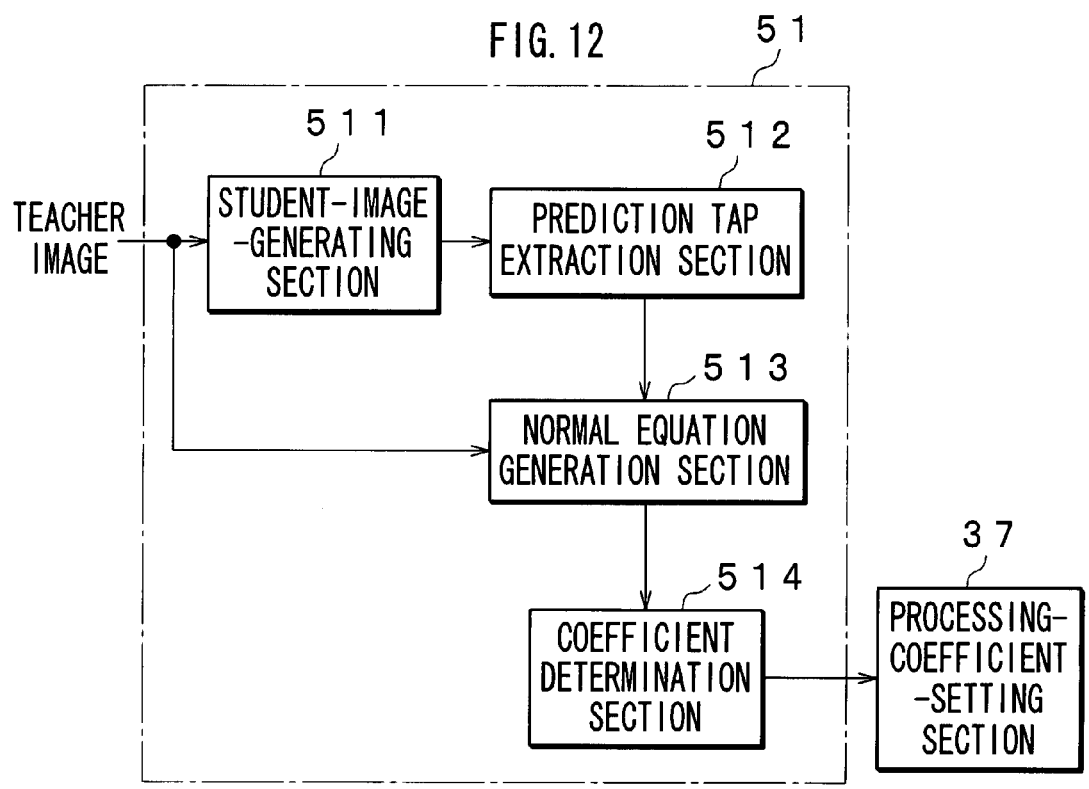
FIG. 12 is a functional block diagram of a learning section.

FIG. 12 is a functional block diagram of the learning section 51. A student-image-generating section 511 in the learning section 51 generates the student images by adding any motion blurs corresponding to a motion amount v to each of the teacher images serving as an input image and supplies the student images to a prediction tap extraction section 512.

The prediction tap extraction section 512 sets as a prediction tap a plurality of pixels for a target pixel whose blurs are to be removed, extracts pixel values of the prediction tap from each of the student images, and outputs them to a normal equation generation section 513. It is to be noted that the prediction taps correspond to the above-described processing regions in the case of generating coefficients that correspond to the motion direction and the motion amount.

The normal equation generation section 513 generates a normal equation from pixel values of the prediction taps supplied from the prediction tap extraction section 512 and pixel values of the teacher images and supplies it to a coefficient determination section 514. The coefficient determination section 514 calculates processing coefficients based on the normal equation supplied from the normal equation generation section 513 and stores them in the processing-coefficient-setting section 37. The normal equation generation section 513 and the coefficient determination section 514 will be described further.

In the above-described Equation 4, before learning, the processing coefficients $d_i$ are respectively undetermined ones. Learning is performed by inputting pixels of a plurality of teacher images (still images). In a case where there are m number of pixels of the teacher images and pixel values of the m number of pixels are described as "$q_k$ (k is an integer of 1 through m)", following Equation 5 is derived from the Equation 4.

$$qk \approx \sum_{i=0}^{n} di \times cik = qk' \quad (5)$$

In other words, by calculating a right side of the Equation 5, it is possible to obtain blur removed pixel values $q_k'$, which are approximate equal to actual pixel values $q_k$ containing no motion blur. It is to be noted that an approximately equal symbol, not an equality symbol, is used in the Equation 5 because an error contains therein. In other words, this is because the blur removed pixel values obtained as a result of calculation of the right side do not strictly agree with pixel values on target pixels in an actual image having no motion blur and contain a predetermined error.

In the Equation 5, a processing coefficient $d_i$ that minimizes a sum of squares of the error, if obtained through learning, is considered to be an optimal coefficient to bring the blur removed pixel values $q_k$ close to the pixel values having no motion blur. Therefore, for example, by using m (which is an integer larger than n) number of pixel values $q_k$ gathered through the learning, such an optimal processing coefficient $d_i$ is determined according to the least-squares method.

A normal equation to obtain the processing coefficient $d_i$ in the right side of the Equation 5 according to the least-squares method can be given as Equation 6.

$$\begin{bmatrix} \sum_{k=1}^{m} c_{1k} \times c_{1k} & \sum_{k=1}^{m} c_{1k} \times c_{2k} & \cdots & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \cdots & \sum_{k=1}^{m} c_{2k} \times c_{nk} \\ \vdots & \vdots & & & \vdots \\ \vdots & \vdots & & & \vdots \\ \sum_{k=1}^{m} c_{nk} \times c_{1k} & \sum_{k=1}^{m} c_{nk} \times c_{2k} & \cdots & \cdots & \sum_{k=1}^{m} c_{nk} \times c_{nk} \end{bmatrix} \begin{bmatrix} d_1 \\ d_2 \\ \vdots \\ \vdots \\ d_n \end{bmatrix} = \begin{bmatrix} \sum_{k=1}^{m} c_{1k} \times q_k \\ \sum_{k=1}^{m} c_{2k} \times q_k \\ \vdots \\ \vdots \\ \sum_{k=1}^{m} c_{nk} \times q_k \end{bmatrix} \quad (6)$$

Therefore, by solving the normal equation indicated in the Equation 6, the processing coefficient $d_i$ can be determined. Specifically, if matrixes of the normal equation indicated in the Equation 6 are defined as the following Equations 7 to 9, the normal equation is given as following Equation 10.

$$C_{MAT} = \begin{bmatrix} \sum_{k=1}^{m} c_{1k} \times c_{1k} & \sum_{k=1}^{m} c_{1k} \times c_{2k} & \cdots & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \cdots & \sum_{k=1}^{m} c_{2k} \times c_{nk} \\ \vdots & \vdots & & & \vdots \\ \vdots & \vdots & & & \vdots \\ \sum_{k=1}^{m} c_{nk} \times c_{1k} & \sum_{k=1}^{m} c_{nk} \times c_{2k} & \cdots & \cdots & \sum_{k=1}^{m} c_{nk} \times c_{nk} \end{bmatrix} \quad (7)$$

$$D_{MAT} = \begin{bmatrix} d_1 \\ d_2 \\ M \\ M \\ d_n \end{bmatrix} \quad (8)$$

$$Q_{MAT} = \begin{bmatrix} \sum_{k=1}^{m} c_{1k} \times q_k \\ \sum_{k=1}^{m} c_{2k} \times q_k \\ \vdots \\ \vdots \\ \sum_{k=1}^{m} c_{nk} \times q_k \end{bmatrix} \quad (9)$$

$$C_{MAT} D_{MAT} = Q_{MAT} \quad (10)$$

As indicated in the Equation 8, elements of the matrix $D_{MAT}$ are processing coefficients to be obtained. Therefore, in the Equation 10, once the matrix $C_{MAT}$ on the left side and the matrix $Q_{MAT}$ on the right side are determined, it is possible to calculate the matrix $D_{MAT}$ (i.e., processing coefficient $d_i$) by any matrix solving methods. Specifically, as indicated in the Equation 7, elements of the matrix $C_{MAT}$ can be calculated if prediction taps $c_{ik}$ are already known. Since the prediction taps $c_{ik}$ are extracted by the prediction tap extraction section 512, the normal equation generation section 513 can calculate the elements of matrix $C_{MAT}$ by utilizing the respective prediction taps $c_{ik}$ supplied from the prediction tap extraction section 512.

Also, as indicated in the Equation 9, elements of the matrix $Q_{MAT}$ can be calculated if the prediction taps $c_{ik}$ and the pixel values $q_k$ of the still images are already known. The prediction taps $c_{ik}$ are the same as those included in the elements of matrix $C_{MAT}$ and the pixel values $q_k$ correspond to pixels of the teacher images with respect to target pixels (pixels of the student images) contained in each of the prediction taps $c_{ik}$. Therefore, the normal equation generation section 513 can calculate the elements of matrix $Q_{MAT}$ by utilizing the prediction taps $c_{ik}$ supplied from the prediction tap extraction section 512 and the teacher images.

Thus, the normal equation generation section 513 calculates the elements of matrixes $C_{MAT}$ and $Q_{MAT}$ and supplies results of the calculations to the coefficient determination section 514.

The coefficient determination section 514 calculates the processing coefficients $d_i$, which are the elements of matrix $D_{MAT}$ of the above-described Equation 8. Specifically, the normal equation of the above-described Equation 10 can be changed into following Equation 11.

$$D_{MAT} = C_{MAT}^{-1} Q_{MAT} \quad (11)$$

In the Equation 11, the elements of matrix $D_{MAT}$ of the left side are the processing coefficients $d_i$ to be obtained. Further, the elements of matrices $C_{MAT}$ and $Q_{MAT}$ are supplied from the normal equation generation section 513. Therefore, when having been supplied with the elements matrixes $C_{MAT}$ and $Q_{MAT}$ from the normal equation generation section 513, the coefficient determination section 514 calculates a matrix of the right side of the Equation 11 to calculate the matrix $D_{MAT}$ and stores a result of the calculation (processing coefficients $d_i$) in the processing-coefficient-setting section 37. In this case, by performing the above-described learning with the motion amount being changed if the motion direction is set to constant one, it is possible to store specific processing coefficients that correspond to motion blur amounts. Further, if the above-described learning is performed by changing the motion direction also, it is possible to store processing coefficients that correspond to the motion blur amounts and the motion directions.

The prediction taps are selected by using a length that is proportional to a motion amount. For example, by using a target pixel as a reference, pixels that fall in the range of "3×motion amount+9 pixels" in a motion direction are defined as a prediction tap. Further, if pixels that fall in a range of "2×motion amount+3 pixels" are defined as a prediction tap, the number in the tap can be decreased to simplify the configuration thereof. Moreover, on the selection of the prediction tap, the prediction taps can be discretely selected according to a motion amount v.

The following will describe the case of discretely selecting the prediction taps in accordance with the motion amount v, with reference to FIG. 13. For example, in the case of defining a pixel position P47 shown in FIG. 13 as a target pixel position and obtaining a pixel value F19 of a target pixel, Equation 12 holds true with taking into consideration a pixel position P45 where an element F19/v of the target pixel appears first and a pixel position P44 which is adjacent to the pixel position P45 and does not have the element F19/v of the target pixel as indicated by broken lines. It is to be noted that the pixel positions P44 and P45 are supposed to have pixel values $DP_{44}$ and $DP_{45}$.

$$F19 - F14 = (DP_{45} - DP_{44}) \times v \quad (12)$$

Similarly, Equation 13 holds true with taking into consideration a pixel position P49 where an element F19/v of the target pixel appears last and a pixel position P50 which is adjacent to the pixel position P49 and does not have the element F19/v of the target pixel as indicated by broken lines.

$$F24 - F19 = (DP_{50} - DP_{49}) \times v \quad (13)$$

In this case, a level of pixel value F14 is obtained approximately utilizing a space correlation. For example, if a pixel position P42 has a high space correlation with its peripheral pixels, such an approximation as indicated in Equation 14 is established.

$$F14 \approx DP_{42} \quad (14)$$

Figures 14, 15:
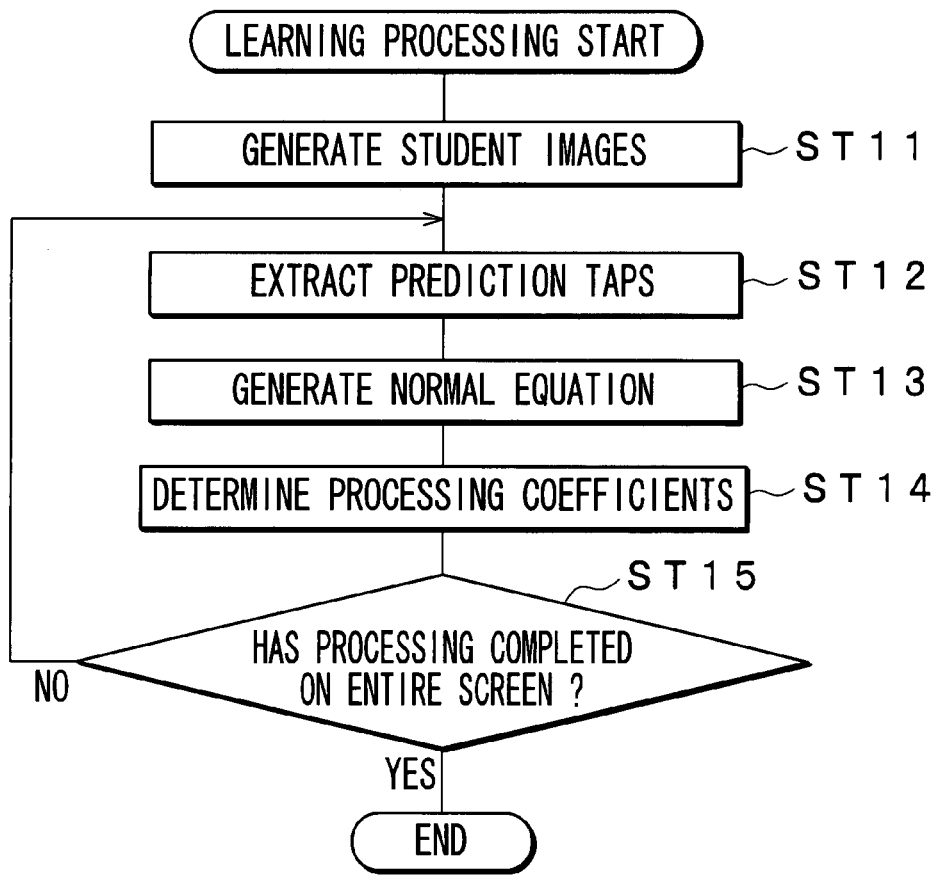
FIG. 14 is a diagram for explaining calculation of an activity.
FIG. 15 is a flowchart for showing processing to learn processing coefficients.

The space correlation, as referred to here, means a relationship represented by a magnitude of an activity of pixels. In other words, the activity refers to a sum of differences among pixels adjacent to a reference pixel, for example. FIG. 14 is a diagram for explaining calculation of the activity. For example, activity AC (P42) of pixel position P42, which is given by following Equation 15, is differences between pixels in a total of nine pixels (3×3 pixels) around the pixel position P42. It is to be noted that in FIG. 14, the pixel position P42-U indicates a pixel one line above the pixel position P42, and the pixel position P42-L indicates a pixel one line below the pixel position P42, and so on.

$$AC(P42) = |DP_{41-u} - DP_{42-u}| + |DP_{42-u} - DP_{43-u}| + \quad (15)$$
$$|DP_{41} - DP_{42}| + |DP_{42} - DP_{43}| +$$
$$|DP_{41-L} - DP_{42-L}| + |DP_{42-L} - DP_{43-L}| +$$
$$|DP_{41-u} - DP_{41}| + |DP_{41} - DP_{41-L}| +$$
$$|DP_{42-u} - DP_{42}| + |DP_{42} - DP_{42-L}| +$$
$$|DP_{43-u} - DP_{43}| + |DP_{43} - DP_{43-L}|$$

Activity AC (P42) of a pixel represented by the pixel position P42 given by the Equation 15 is such that the smaller its value is, the higher a space correlation between the pixel of pixel position P42 and each of the peripheral pixels thereof is and hence the more, approximate is a pixel value of the pixel position P42 to those of the peripheral pixels. Conversely, the larger an activity is, the lower a space correlation between the pixel of pixel position P42 and each of the peripheral pixels thereof and hence the more, the pixel values of the pixel position P42 could be different from those of the peripheral pixels. In other words, it supposes that a higher space correlation means a smaller change in pixel values among pixels, so that it is considered that such a relationship as given by Equation 16 holds true.

$$F12/v = F13/v = F14/v = F15/v = F16/v \quad (16)$$

Therefore, if the activity AC (P42) is small, following Equation 17 is derived, so that the Equation 14 is considered to be established.

$$DP_{42}/v = (F12/v + F13/v + F14/v + F15/v + F16/v) = F14/v \quad (17)$$

Based on the results above, by changing the Equation 12 and substituting a relationship of the Equation 14 into it, F19 is obtained as a level if light made incident upon a pixel of an image having no motion blur as indicated by following Equation 18.

$$F19 = (DP_{45} - DP_{44}) \times v + DP_{42} \quad (18)$$

In a similar manner, Equation 19 is also established.

$$F19 = DP_{52} + (DP_{49} - DP_{50}) \times v \quad (19)$$

Through the above consideration, to obtain the pixel value F19 of the target pixel, pixel positions P42, P44, P45, P49, P50, and P52 can be obtained, so that by using pixel position P47 of the target pixel as reference, pixels of pixel positions P42, P44, P45, P49, P50, and P52 can be also used as a prediction tap.

FIG. 15 is a flowchart for showing processing to learn processing coefficients. At step ST11, the student images are generated from the teacher images. In other words, by adding a motion blur to each of the teacher images, the student images are generated to each of which the motion blur is added.

At step ST12, prediction taps are extracted from the student images. At step ST13, a normal equation is generated from the prediction taps and pixels of the teacher images.

At step ST14, the normal equation generated at step ST13 is solved to thereby determine processing coefficients and stores them in the processing-coefficient-setting section 37.

At step ST15, it is determined whether the processing is performed on all pixels and, if the processing is not performed yet on any of the pixels, processing starting from step ST12 repeats on new pixels while if the processing is completed on all pixels, the learning processing ends.

By performing the above processing to generate processing coefficients for removing a motion blur through learning and storing them in the processing-coefficient-setting section 37, the motion-blur-removing processing can be performed.

Further, to detect a magnitude of an activity as described above, that is, to detect whether there is a space correlation or not, classes are categorized in accordance with the magnitude of the activity to change processing regions corresponding to a class code, which is a result of the class categorization, thereby enabling accuracy for blur-removing to be improved.

In this case, the processing-region-setting section 36 extracts a class tap that corresponds to a target pixel, determines a class code from the extracted class tap, sets a processing regions that correspond to the target pixels according to the class code, and supplies pixel values in the processing region to the pixel-value-generating section 38. Further, the determined class code is supplied from the processing-region-setting section 36 to the processing-coefficient-setting section 37 so that processing coefficients that correspond to the motion blur amount MB and the class code may be read out of the memory and supplied to the pixel-value-generating section 38.

In this case, in a case where class categorization is performed based on the magnitude of an activity, pixels used in calculation of the activity are extracted as the class tap as described with reference to FIGS. 13 and 14. The extracted class tap is used to obtain the activity as described above, and then, based on the activity thus obtained, the class code is detected. For example, if activities AC (P42) and AC (P52) are obtained when the activity AC (P42) is found to be smaller an the activity AC (P52), the class code is set to "1" and, when the activity AC (P52) is smaller than the activity AC (P42), the class code is set to "2" so that the class code may subsequently be supplied to the processing-coefficient-setting section 37.

Moreover, the processing-region-setting section 36 sets processing regions that correspond to the target pixels in accordance with the class code. For example, if the class code is "1", pixel values of pixel positions P42, P44, and P45 are supplied as pixel values in the processing region to the pixel-value-generating section 38 because the pixel position P42 has a higher space correlation than that of the pixel position P52. Further, if the class code is "2", pixel values of pixel positions P49, P50, and P52 are supplied as pixel values in the processing region to the pixel-value-generating section 38 because the pixel position P52 has a higher space correlation than that of the pixel position P42.

The processing-coefficient-setting section 37 stores beforehand processing coefficients obtained by a later-described learning section through learning corresponding to a class code and supplies processing coefficients that correspond to the class code and the motion amount to the pixel-value-generating section 38.

The blur-removing-processing sections 381 to 383 in the pixel-value-generating section 38 perform calculation processing by using the pixel values in the processing regions and the processing coefficients supplied from the processing-coefficient-setting section 37 to generate the blur-removed pixel values and supply them to the integration section 39. The integration section 39 integrates the pixel values supplied from the blur-removing-processing sections 381 to 383 and outputs a pixel value of the target pixel in the prediction image, from which any motion blurs are already removed.

Figure 16:
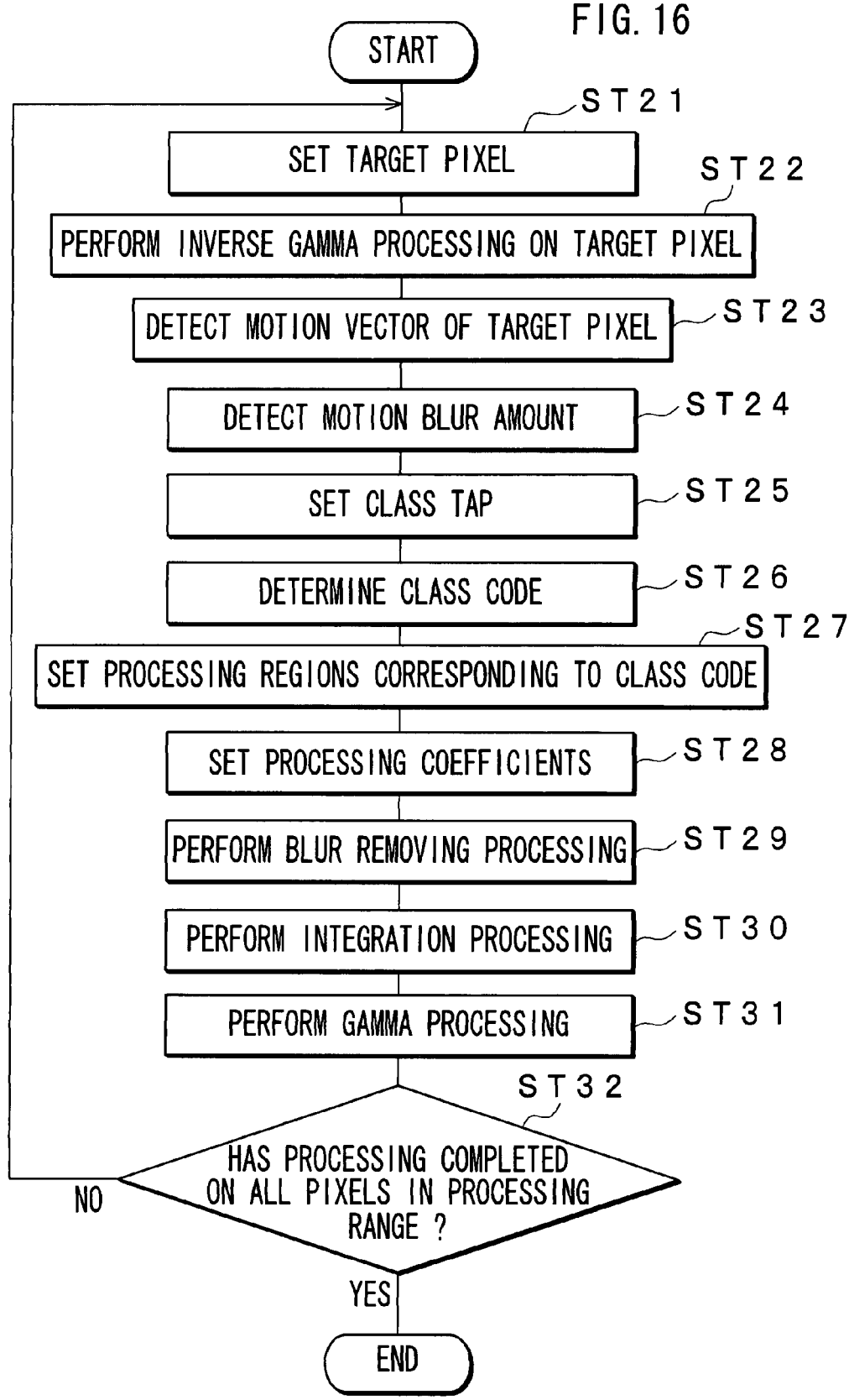
FIG. 16 is a flowchart of image processing by use of class categorization.

FIG. 16 shows a flowchart of image processing by use of the class categorization. At step ST21, the CPU 201 sets a target pixel whose motion blurs are to be removed in the target image and then proceeds to step ST22. At the step ST22, the CPU 201 performs inverse gamma processing on the target pixel based on a gamma value indicated by shooting information, to generate an image signal at the time when an image of a real world is projected. At step ST23, the CPU 201 detects a motion vector of the target pixel and proceeds to step ST24. At the step ST24, the CPU 201 detects a motion blur amount of the target pixel. In other words, it performs calculation processing by using exposure time information indicated by the shooting information and the motion vector detected at the step ST23, thereby detecting the motion blur amount of the target pixel in a period of exposure time.

At step ST25, the CPU 201 extracts a class tap corresponding to the motion blur amount obtained at the step ST24 and proceeds to step ST26. At the step ST26, the CPU 201 categorizes classes and determines a class code from the class tap.

At step ST27, the CPU 201 sets processing regions. In other words, the CPU 201 sets images to be processed based on the target pixel in the target image and sets target pixels in the images to be processed. Moreover, it sets processing regions that correspond to the class code, the motion blur amount of the target pixel, and the motion direction with reference to the target pixel in each of the images to be processed and then proceeds to step ST28.

At the step ST28, the CPU 201 sets processing coefficients that correspond to the motion blur amount of the target pixel and the class code, or processing coefficients that correspond to a moving direction that corresponds to the motion vector detected at the step ST22, the motion blur amount of the target pixel, and the class code and then proceeds to step ST29.

At the step ST29, the CPU 201 performs blur-removing processing on each of the images to be processed. In other words, the CPU 201 performs calculation processing on the pixel values in the processing regions set at the step ST27 and the processing coefficients set at the step ST28 corresponding to the motion amount, the motion direction, and the class code, thereby generating pixel values that correspond to the target pixels. Alternatively, it generates new pixel values for processing from the pixel values in the processing regions and performs calculation processing on the pixel values for processing and the specific processing coefficients set at step ST28 corresponding to the motion amount and the class code to thereby calculate a blur removed pixel value for each pixel in the images to be processed, and proceeds to step ST30.

At the step ST30, the CPU 201 integrates the pixel values calculated at the step ST29 for each image to be processed and outputs the obtained pixel value as a motion-blur removed pixel value of the target pixel and then proceeds to step ST31. At the step ST31, the CPU 201 performs gamma processing on the target pixel by using the gamma value indicated by the shooting information and outputs a gamma processed pixel value as an image signal DVout.

At step ST32, the CPU 201 decides whether blur-removing processing is completed on all pixels in a processing range and, if the blur-removing processing is not performed yet on any of the pixels, it returns to the step ST21 while if the blur-removing processing is completed on all pixels in the processing range, it ends the image processing on the target image.

Figure 17:
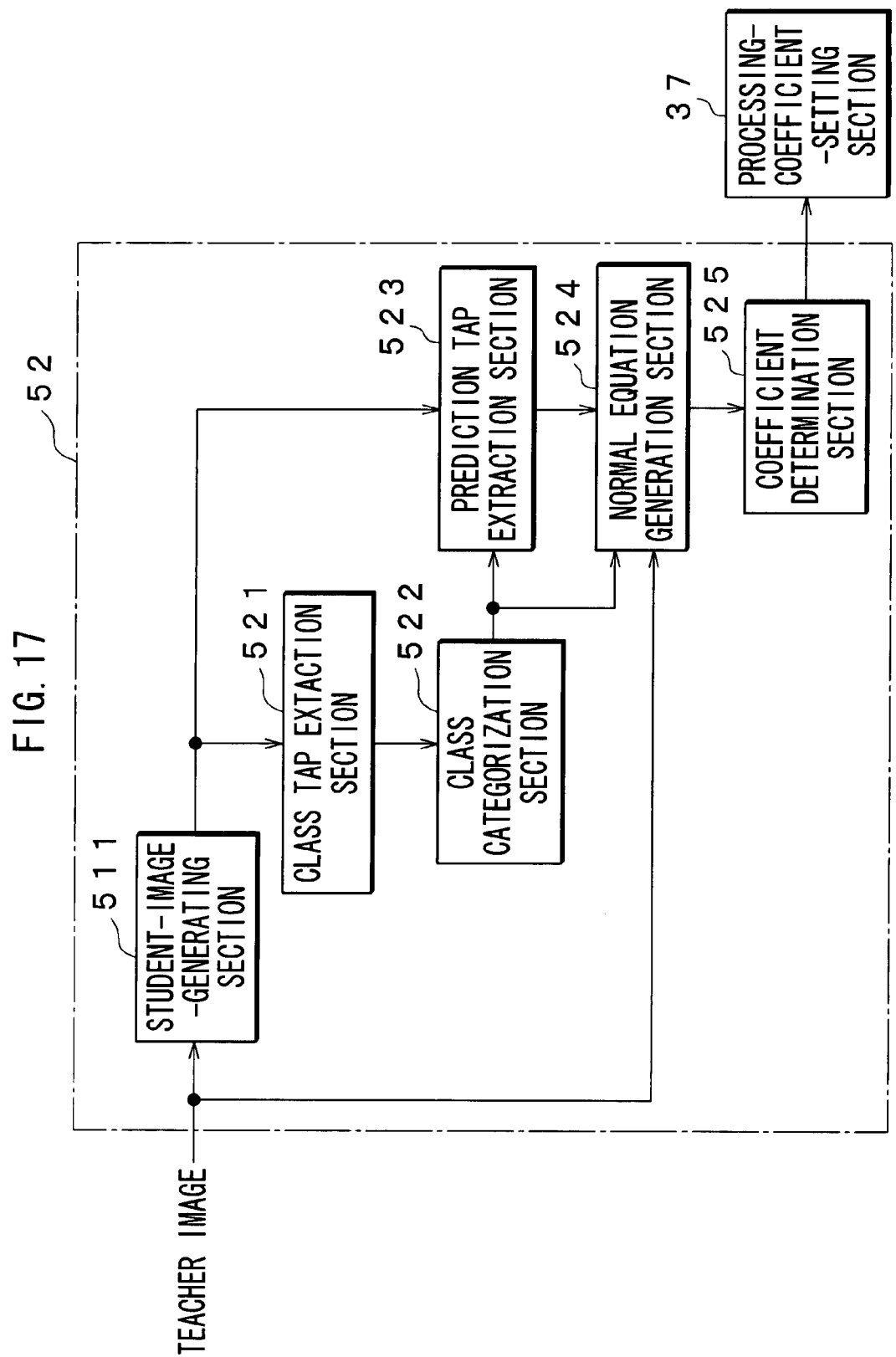
FIG. 17 is a functional block diagram of a learning section in the case of executing class categorization.

The following will describe learning of processing coefficients in the case of performing class categorization. FIG. 17 is a functional block diagram of a learning section 52 in the case of categorizing classes. It is to be noted that components of FIG. 17 that correspond to those of FIG. 12 are indicated by the same symbols, detailed descriptions of which will be omitted.

A class tap extraction section 521 of the learning section 52 selects a class tap as described above, and supplies the selected class tap to a class categorization section 522. The class categorization section 522 categorizes classes, as described above, to determine a class code and supplies it to a prediction tap extraction section 523 and a normal equation generation section 524.

The prediction tap extraction section 523 switches prediction taps in accordance with the class code to extract and supply it to the normal equation generation section 524.

Being the same as the normal equation generation section 513 of FIG. 12 basically, the normal equation generation section 524 generates a normal equation for each class code supplied from the class categorization section 522 and outputs it to a coefficient determination section 525. Therefore, the coefficient determination section 525 determines coefficients for each class code and stores the coefficients determined for each class code in the processing-coefficient-setting section 37. In this case, if a motion direction is specified to generate a student image for each motion amount, specific processing coefficients that correspond to the motion amount and the class code are stored in the processing-coefficient-setting section 37. Further, if a motion amount and a motion direction are switched to generate student signals, processing coefficients that correspond to the motion amount, the motion direction, and the class code are stored in the processing-coefficient-setting section 37.

Figure 18:
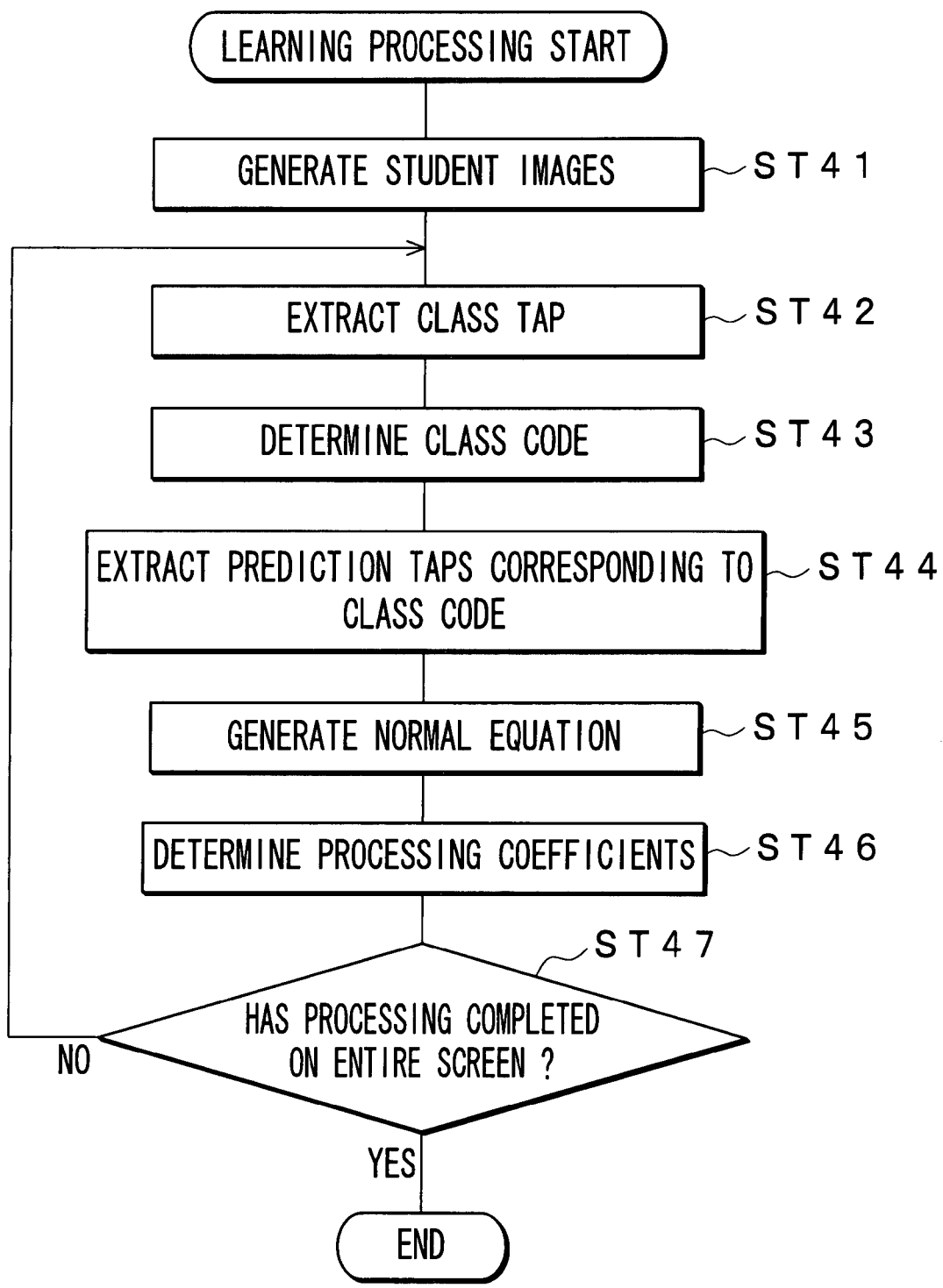
FIG. 18 is a flowchart for showing processing to learn a processing coefficient by use of class categorization.

FIG. 18 is a flowchart for showing processing to learn processing coefficients by employing class categorization. At step ST41, student images are generated from teacher images. In other words, by adding a motion blur to each of the teacher images, the student images are generated, to each of which a motion blur is added.

At step ST42, a class tap is extracted from each of the student images. The class tap is extracted in the same manner as at the above-described step ST25.

At step ST43, class categorization is performed from the extracted class tap, to determine a class code. At step ST44, prediction taps are extracted from the student images corresponding to the class code determined at the step ST43.

At step ST45, a normal equation is generated from the prediction taps and pixels of the teacher images for each class code.

At step ST46, the normal equation generated at step ST45 is solved to determine processing coefficients and stores them in the processing-coefficient-setting section 37 for each class code.

At step ST47, it is determined whether the processing is performed on all pixels and, if the processing is not performed yet on any of the pixels, processing starting from step ST42 repeats on new pixels while, if the processing is performed on all pixels, the learning processing ends. It is thus possible to generate the processing coefficients for motion blur removing that corresponds to the motion amount, the motion direction, and the class. Further, by making the motion direction constant, it is possible to generate specific processing coefficients that correspond to the motion amount and the class.

The following describe a case of performing any blur-removing processing in which processing coefficients to be stored in the processing-coefficient-setting section 37 are obtained by using model equations.

Figure 19:
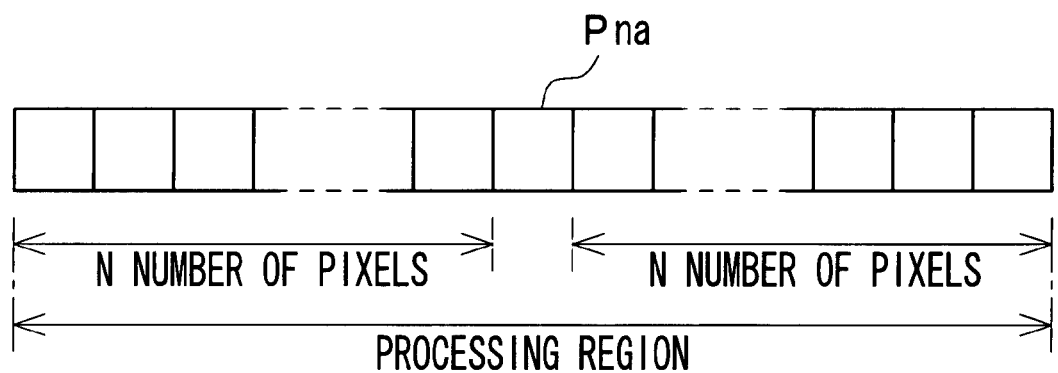
FIG. 19 is a diagram for explaining a processing region.
Figure 20A:
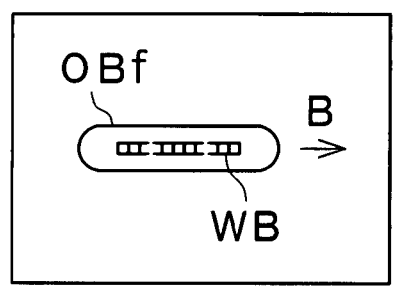
FIGS. 20A and 20B are illustrations each for illustrating an example of setting a processing region.
Figure 20B:
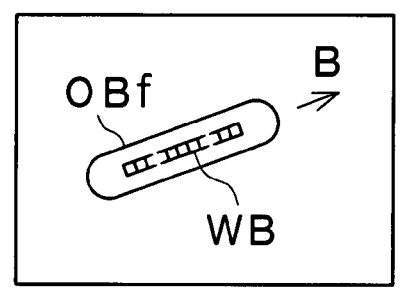

FIG. 19 shows a processing region in a space direction, in which the processing region is set in a motion direction as much as, for example, (2N+1) number of pixels as a center of a target pixel Pna. FIGS. 20A and 20B show setting examples of processing regions, in which a processing region WB is set horizontally as shown in FIG. 20A when a direction of a motion vector is, for example, horizontal as indicated by an arrow B with respect to a pixel of a moving object OBf whose motion blurs are to be mitigated. When a direction of a motion vector is oblique, as shown in FIG. 20B, a processing region WB is set in a corresponding angle. However, when setting the processing region obliquely, a pixel value that corresponds to a pixel position in the processing region is obtained by interpolation etc.

Figure 21:
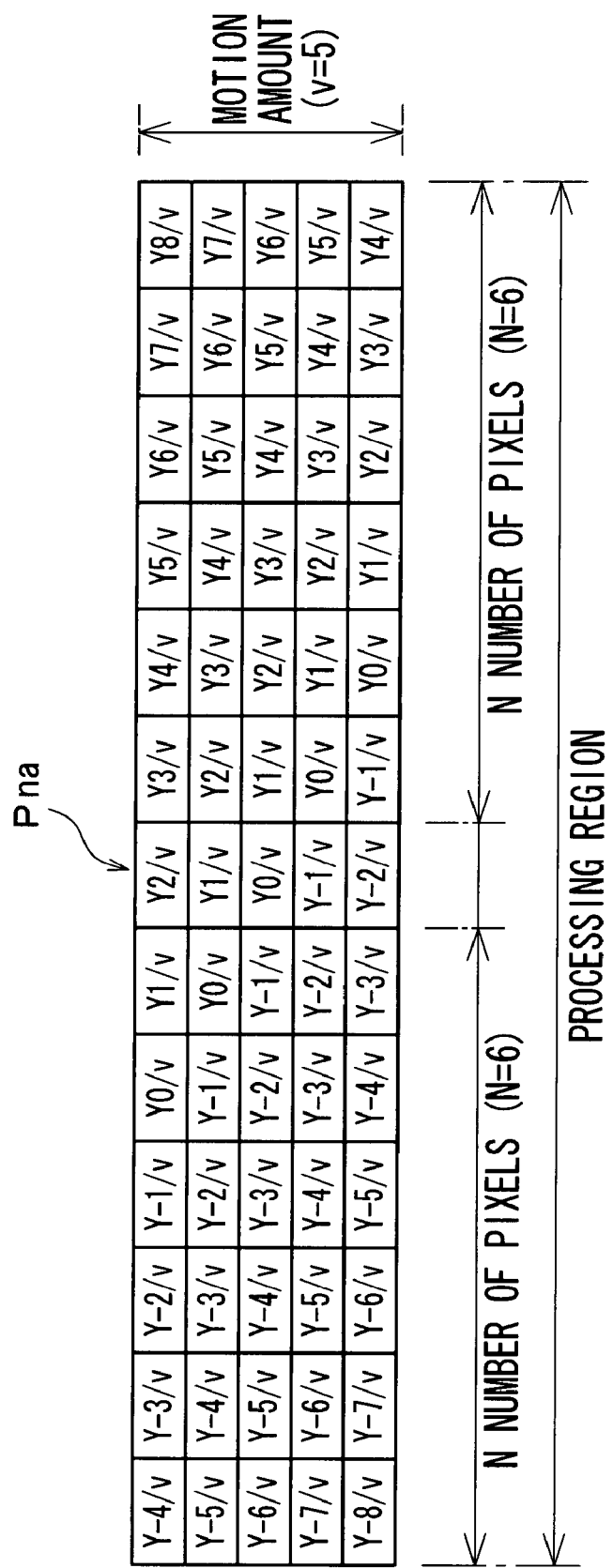
FIG. 21 is an explanatory chart of time-wise mixture of real world variables in a processing region (in a case where a motion amount v=5)

Herein, in the processing region, as shown in FIG. 21, real world variables ($Y_{-8}, \ldots, Y_0, \ldots, Y_8$) are mixed time-wise. It is to be noted that FIG. 21 shows a case where a motion amount v is set to "v=5" and the processing region is made up of 13 pixels (N=6, where N is the number of pixels in a width of processing for the target pixel Pna).

In blur-removing processing, a real world is estimated on the processing region, to output only central pixel variable $Y_0$ of the estimated real world as a pixel value of a target pixel whose motion blurs have been removed.

If the pixel values of the pixels constituting the processing region are represented by $X_{-N}, X_{-N+1}, \ldots, X_0, \ldots, X_{N-1}, X_N$, (2N+1) number of mixture equations such as ones indicated in Equation 20 are established. It is to be noted that constant h indicates a value of an integral portion of the motion amount v multiplied by ½, that is, a value obtained by discarding its decimal places.

$$\sum_{i=t-h}^{t+h} (Y_i/v) = X_t \qquad (20)$$

(where $t = -N, \ldots, 0, \ldots, N$)

However, there are (2N+v) number of real world variables ($Y_{-N-h}, \ldots, Y_0, \ldots, Y_{N+h}$). In other words, the equations are outnumbered by the variables, so that it is impossible to obtain the real world variables ($Y_{-N-h}, \ldots, Y_0, \ldots, Y_{N+h}$) based on the Equation 20.

Therefore, by using Equation 21, which is a constraint equation employing a space correlation, the number of the equations is increased than the real world variables, to obtain values of the real world variables by the least-squares method.

$$Y_t - Y_{t+1} = 0 \text{ (where } t=-N-h, \ldots, 0, \ldots, N+h-1) \qquad (21)$$

In other words, by using (4N+v) number of equations including the (2N+1) number of mixture equations represented by the Equation 20 and the (2N+v−1) number of constraint equations represented by the Equation 21, the (2N+v) number of unknown real world variables ($Y_{-N-h}, \ldots, Y_0, \ldots, Y_{N+h}$) are obtained.

Herein, by performing such estimation as to minimize a sum of squares of errors that occur in the equations, it is possible to suppress fluctuations in the pixel values in the real world with performing processing to generate an image in which motion blur is mitigated.

Equation 22 indicates a case where the processing region is set as shown in FIG. 21, in which errors that occur in the respective Equations 20 and 21 are added to them.

$$\begin{bmatrix} 1/v & 1/v & 1/v & 1/v & 1/v & 0 & 0 & 0 & 0 & 0 & 0 & 0 & 0 & 0 & 0 & 0 & 0 \\ 0 & 1/v & 1/v & 1/v & 1/v & 1/v & 0 & 0 & 0 & 0 & 0 & 0 & 0 & 0 & 0 & 0 & 0 \\ 0 & 0 & 1/v & 1/v & 1/v & 1/v & 1/v & 0 & 0 & 0 & 0 & 0 & 0 & 0 & 0 & 0 & 0 \\ 0 & 0 & 0 & 1/v & 1/v & 1/v & 1/v & 1/v & 0 & 0 & 0 & 0 & 0 & 0 & 0 & 0 & 0 \\ 0 & 0 & 0 & 0 & 1/v & 1/v & 1/v & 1/v & 1/v & 0 & 0 & 0 & 0 & 0 & 0 & 0 & 0 \\ 0 & 0 & 0 & 0 & 0 & 1/v & 1/v & 1/v & 1/v & 1/v & 0 & 0 & 0 & 0 & 0 & 0 & 0 \\ 0 & 0 & 0 & 0 & 0 & 0 & 1/v & 1/v & 1/v & 1/v & 1/v & 0 & 0 & 0 & 0 & 0 & 0 \\ 0 & 0 & 0 & 0 & 0 & 0 & 0 & 1/v & 1/v & 1/v & 1/v & 1/v & 0 & 0 & 0 & 0 & 0 \\ 0 & 0 & 0 & 0 & 0 & 0 & 0 & 0 & 1/v & 1/v & 1/v & 1/v & 1/v & 0 & 0 & 0 & 0 \\ 0 & 0 & 0 & 0 & 0 & 0 & 0 & 0 & 0 & 1/v & 1/v & 1/v & 1/v & 1/v & 0 & 0 & 0 \\ 0 & 0 & 0 & 0 & 0 & 0 & 0 & 0 & 0 & 0 & 1/v & 1/v & 1/v & 1/v & 1/v & 0 & 0 \\ 0 & 0 & 0 & 0 & 0 & 0 & 0 & 0 & 0 & 0 & 0 & 1/v & 1/v & 1/v & 1/v & 1/v & 0 \\ 0 & 0 & 0 & 0 & 0 & 0 & 0 & 0 & 0 & 0 & 0 & 0 & 1/v & 1/v & 1/v & 1/v & 1/v \\ 1 & -1 & 0 & 0 & 0 & 0 & 0 & 0 & 0 & 0 & 0 & 0 & 0 & 0 & 0 & 0 & 0 \\ 0 & 1 & -1 & 0 & 0 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & \square & 0 & 0 \\ 0 & 0 & 0 & 1 & -1 & 0 & 0 & 0 & 0 & 0 & 0 & 0 & 0 & 0 & 0 & 0 & 0 \\ 0 & 0 & 0 & 0 & 1 & -1 & 0 & 0 & 0 & 0 & 0 & 0 & 0 & 0 & 0 & 0 & 0 \\ 0 & 0 & 0 & 0 & 0 & 1 & -1 & 0 & 0 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 & 0 \\ 0 & 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 0 & 1 & -1 & 0 & 0 & 0 & 0 & 0 & 0 & 0 \\ 0 & 0 & 0 & 0 & 0 & 0 & 0 & 0 & 0 & 1 & -1 & 0 & 0 & 0 & 0 & 0 & 0 \\ 0 & 0 & 0 & 0 & 0 & 0 & 0 & 0 & 0 & 0 & 1 & -1 & 0 & 0 & 0 & 0 & 0 \\ 0 & 0 & 0 & 0 & 0 & 0 & 0 & 0 & 0 & 0 & 0 & 1 & -1 & 0 & 0 & 0 & 0 \\ 0 & 0 & 0 & 0 & 0 & 0 & 0 & 0 & 0 & 0 & 0 & 0 & 1 & -1 & 0 & 0 & 0 \\ 0 & 0 & 0 & 0 & 0 & 0 & 0 & 0 & 0 & 0 & 0 & 0 & 0 & 1 & -1 & 0 & 0 \\ 0 & 0 & 0 & 0 & 0 & 0 & 0 & 0 & 0 & 0 & 0 & 0 & 0 & 0 & 1 & -1 & 0 \\ 0 & 0 & 0 & 0 & 0 & 0 & 0 & 0 & 0 & 0 & 0 & 0 & 0 & 0 & 0 & 1 & -1 \end{bmatrix} \begin{bmatrix} Y_{-8} \\ Y_{-7} \\ Y_{-6} \\ Y_{-5} \\ Y_{-4} \\ Y_{-3} \\ Y_{-2} \\ Y_{-1} \\ Y_0 \\ Y_1 \\ Y_2 \\ Y_3 \\ Y_4 \\ Y_5 \\ Y_6 \\ Y_7 \\ Y_8 \end{bmatrix} = \begin{bmatrix} X_{-6} \\ X_{-5} \\ X_{-4} \\ X_{-3} \\ X_{-2} \\ X_{-1} \\ X_0 \\ X_1 \\ X_2 \\ X_3 \\ X_4 \\ X_5 \\ X_6 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \end{bmatrix} + \begin{bmatrix} e_{m_{-6}} \\ e_{m_{-5}} \\ e_{m_{-4}} \\ e_{m_{-3}} \\ e_{m_{-2}} \\ e_{m_{-1}} \\ e_{m_0} \\ e_{m_1} \\ e_{m_2} \\ e_{m_3} \\ e_{m_4} \\ e_{m_5} \\ e_{m_6} \\ e_{b_0} \\ e_{b_1} \\ e_{b_2} \\ e_{b_3} \\ e_{b_4} \\ e_{b_5} \\ e_{b_6} \\ e_{b_7} \\ e_{b_8} \\ e_{b_9} \\ e_{b_{10}} \\ e_{b_{11}} \\ e_{b_{12}} \\ e_{b_{13}} \\ e_{b_{14}} \\ e_{b_{15}} \end{bmatrix} \quad (22)$$

This Equation 22 can be expressed as Equation 23 and such Y ($=Y_i$) as to minimize a sum of squares E of errors indicated in Equation 24 is obtained as Equation 25. It is to be noted that T in the Equation 25 stands for a transposed matrix.

$$AY = X + e \quad (23)$$

$$E = |e|^2 = \Sigma emi^2 + \Sigma ebi^2 \quad (24)$$

$$Y = (A^T A)^{-1} A^T X \quad (25)$$

Herein, a sum of squares of errors is indicated by Equation 26, so that by partially differentiating the sum of squares of the errors in order to provide a partial differential value of 0 as indicated by Equation 27, the Equation 25 that minimizes the sum of squares of the errors can be obtained.

$$E = (AY - X)^T (AY - X) \quad (26)$$
$$= Y^T A^T A Y - 2Y^T A^T X + X^T X$$

$$\partial E / \partial Y = 2(A^T A Y - A^T Y) = 0 \quad (27)$$

By performing linear combination on this Equation 25, the real world variables ($Y_{-N-h}, \ldots, Y_0, \ldots, Y_{N+h}$) can be respectively obtained so that a pixel value of the central pixel variable $Y_0$ can be output as a pixel value of the target pixel. In other words, by obtaining a coefficient for the central pixel variable $Y_0$ for each motion amount, storing them as processing coefficients beforehand in the processing-coefficient-setting section 37, using processing coefficients that correspond to motion amounts stored in the processing-coefficient-setting section 37 to calculate multiply and accumulation of it and pixel values, a motion-blur-removed pixel value is output. By performing such processing on all of the pixels in the processing region, it is possible to obtain motion-blur-mitigated real world variables in the processing region.

Although the above example has obtained the real world variables ($Y_{-N-h}, \ldots, Y_0, \ldots, Y_{N+h}$) by the least-squares method so that a sum of squares E of errors in AY=X+e may be minimized, it is also possible to make the equations in such a manner that the number of the equations may be equal to the number of the variables. By assuming this equation to be AY=X and modifying it into $Y=A^{-1}X$, the real world variables ($Y_{-N-h}, \ldots, Y_0, \ldots, Y_{N+h}$) can be obtained.

The above-described configuration and processing can be applied to any cases of accompanying its shutter operation or no shutter operation; however, in a case where no shutter operation is executed in the image pick-up section 10, a time-directional main term can be used to obtain a pixel value of the target pixel from images of two frames, thereby further simplifying the configuration of the image-processing apparatus.

Figure 22:
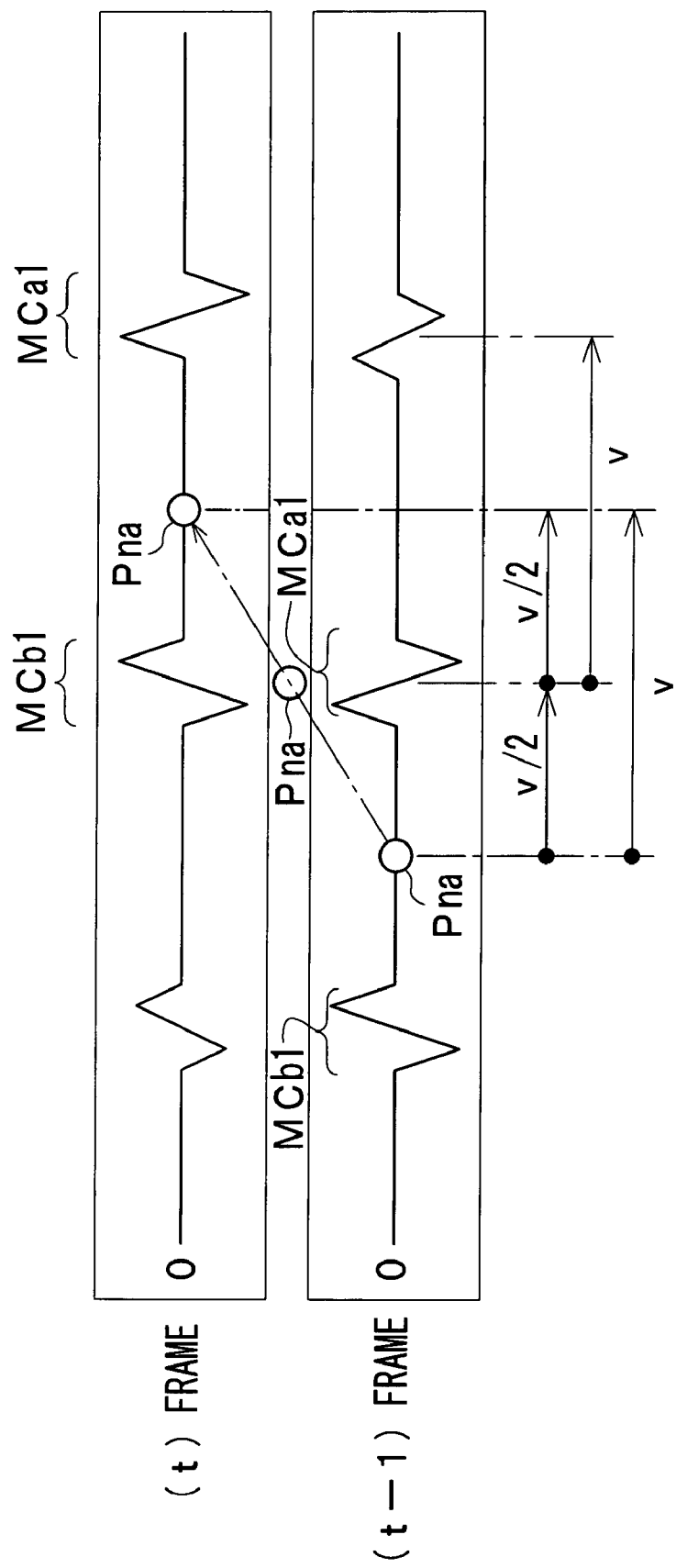
FIG. 22 is a diagram for explaining a main term and a processing coefficient.

Hereinafter, the main terms will be described. If processing coefficients which are used for each pixel are obtained by the above-described model equations etc., the processing coefficients get such a shape as shown in FIG. 22, thus having a portion where their own absolute value increases. Such portions of the processing coefficients as to have an increased absolute value provide the main terms. Locations of the main terms become pixel positions that correspond to a motion direction and a motion amount with reference to the target pixel Pna. It is to be noted that in FIG. 22, a main term MCa1 as being closest to the target pixel Pna in the moving direction and a main term MCb1 as being closest to it in a direction opposite to the motion direction. The main terms Mca1 and MCb1 occur at positions that are distant from the target pixel Pna by a half the motion amount v in the motion direction and the direction opposite to the motion direction, respectively. Further, main terms adjacent to the target pixel Pna occur at positions that are distant from each other by the motion amount in the motion direction or the direction opposite to the motion direction.

If the main terms are used in the time direction, the positions of the main terms are indicated at the same pixel position. In other words, with paying attention to the above-described main terms MCa1 and MCb1, the position of the main term MCa1 in an image of the (t−1) frame agrees with that of the main term MCb1 in an image of the (t) frame. Therefore, a pixel position which has a phase at the center of the (t−1) and (t) frames and at which both the main terms MCa1 and MCb1 are located corresponds to the target pixel Pna. Therefore, by calculating a pixel value by using main terms of, for example, two frames and outputting the pixel value at a phase at the center of the two frames, it is possible to properly output a pixel value of the target pixel Pna from which motion blur has been removed.

Figure 23:
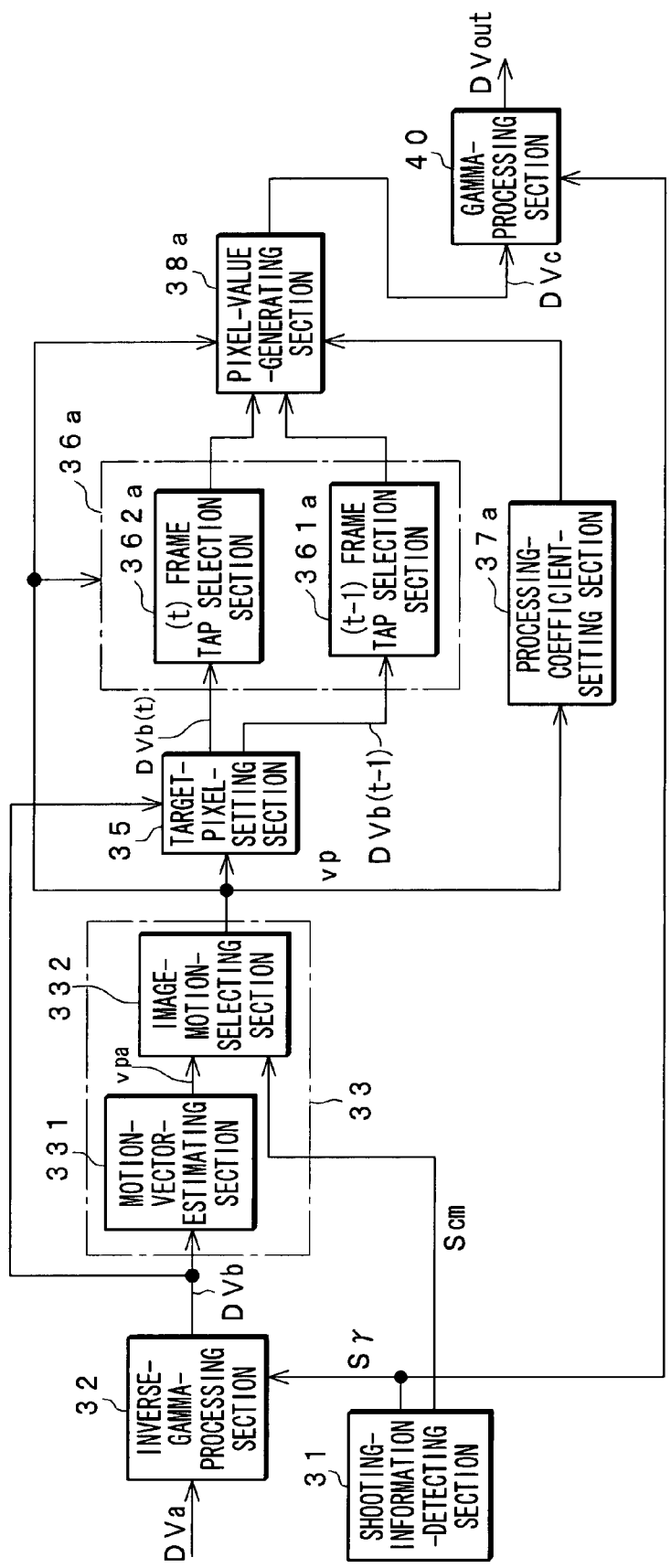
FIG. 23 is another functional block diagram of the image-processing apparatus.

FIG. 23 is a functional block diagram of the image-processing apparatus that removes motion blur by using main terms in space and time directions to employ the center of frames as a phase at which the motion-blur-removed target position Pna is to be output. It is to be noted that components of FIG. 23 that correspond to those of FIG. 6 are indicated by the same symbols, detailed description of which will be omitted.

If using main terms in space and time directions to employ the center of frames as a phase at which the motion-blur-removed target position Pna is to be output, in order to obtain an image of one frame, images of two frames must be used. Accordingly, the processing-region-setting section in the image-processing apparatus shown in FIG. 23 is provided with a (t−1) frame tap selection section 361a and a (t) frame tap selection section 362a. A pixel-value-generating section 38a uses pixel values extracted from two consecutive frames and processing coefficients supplied from the processing-coefficient-setting section 37, to generate a pixel value of the target pixel Pna whose motion blur has been removed with the center of the two frames being provided as a phase at which the pixel value is to be output.

In order to extract a train term that mainly contains components of a target pixel in a moving object that encounter a motion blur in an image to be processed, which is supplied from the target-pixel-setting section 35, from this image to be processed, the (t−1) frame tap selection section 361a extracts at least pixel values of pixels whose space position roughly agrees with that of the target pixel having a phase located at the center of a (t−1) frame and a (t) frame and supplies it to the pixel-value-generating section 38.

As in the case of the (t−1) frame tap selection section 361a, in order to extract a main term that mainly contains components of a target pixel in the moving object that encounters the motion blur in the image to be processed, which is supplied from the target-pixel-setting section 35, from this image to be processed, the (t) frame tap selection section 362a extracts at least pixel values of pixels whose space position roughly agrees with that of the target pixel having a phase located at the center of two frames and supplies it to the pixel-value-generating section 38.

A processing-coefficient-setting section 37a stores beforehand specific processing coefficients based on motion blur amounts or processing coefficients based on the motion blur amounts and motion directions and then, based on image motion information vp supplied from the motion-detecting section 33, it supplies the pixel-value-generating section 38a with specific processing coefficients based on a motion blur amounts indicated by the image motion information vp. Alternatively, it supplies the pixel-value-generating section 38a with specific processing coefficients based on the motion directions and the motion blur amounts indicated by the image motion information vp.

When receiving the specific processing coefficients based on the motion blur amount from the processing-coefficient-setting section 37a, the pixel-value-generating section 38a generates pixel values for processing by using the above-described Equation 3 corresponding to the pixel values extracted from the (t−1) frame tap selection section 361a in the processing-region-setting section 36 and the motion direction indicated by the image motion information vp. Multiply and accumulation calculation of thus generated pixel values for processing and the specific processing coefficients is performed, to generate a pixel value. Further, pixel values for processing are newly generated corresponding to the pixel values extracted from the (t) frame tap selection section 362a and the motion direction indicated by the image motion information vp. Multiply and accumulation calculation of thus generated pixel values for processing and the specific processing coefficients is performed, to generate a pixel value.

Further, when receiving the specific processing coefficients base on the motion blur amount and the motion direction from the processing-coefficient-setting section 37a, the pixel-value-generating section 38a generates a pixel value by performing multiply and accumulation of the pixel values extracted from the (t−1) frame tap selection section 361a in the processing-region-setting section 36a and the processing coefficients. It further performs multiply and accumulation calculation of the pixel values extracted from the (t) frame tap selection section 362a and the processing coefficients, thereby generating a pixel value.

Moreover, the pixel-value-generating section 38a performs simple averaging, weighted adding, median filter processing, etc. by using pixel values of target pixels of two frames, thereby generating a pixel value of one target pixel and supplies it as an image signal DVc to the gamma-processing section 40 at a phase located at the center of the (t) and (t−1) frames.

It is to be noted that if main terms in space and time directions are used to remove a motion blur by employing the center of the frames as a phase at which the motion-blur-removed target pixel Pna is to be output, positions of the main terms agrees with position of the target pixel in the time direction. Therefore, by setting a processing region that extends horizontally and vertically with respect to the position of the target pixel of a phase centered between the (t−1) and (t) frames, the (t−1) frame tap selection section 361a and the (t) frame tap selection section 362a can obtain pixel values used in the multiply and accumulation calculation with the processing coefficients by the pixel-value-generating section 38a even if processing region is not set for each motion direction.

Figure 24:
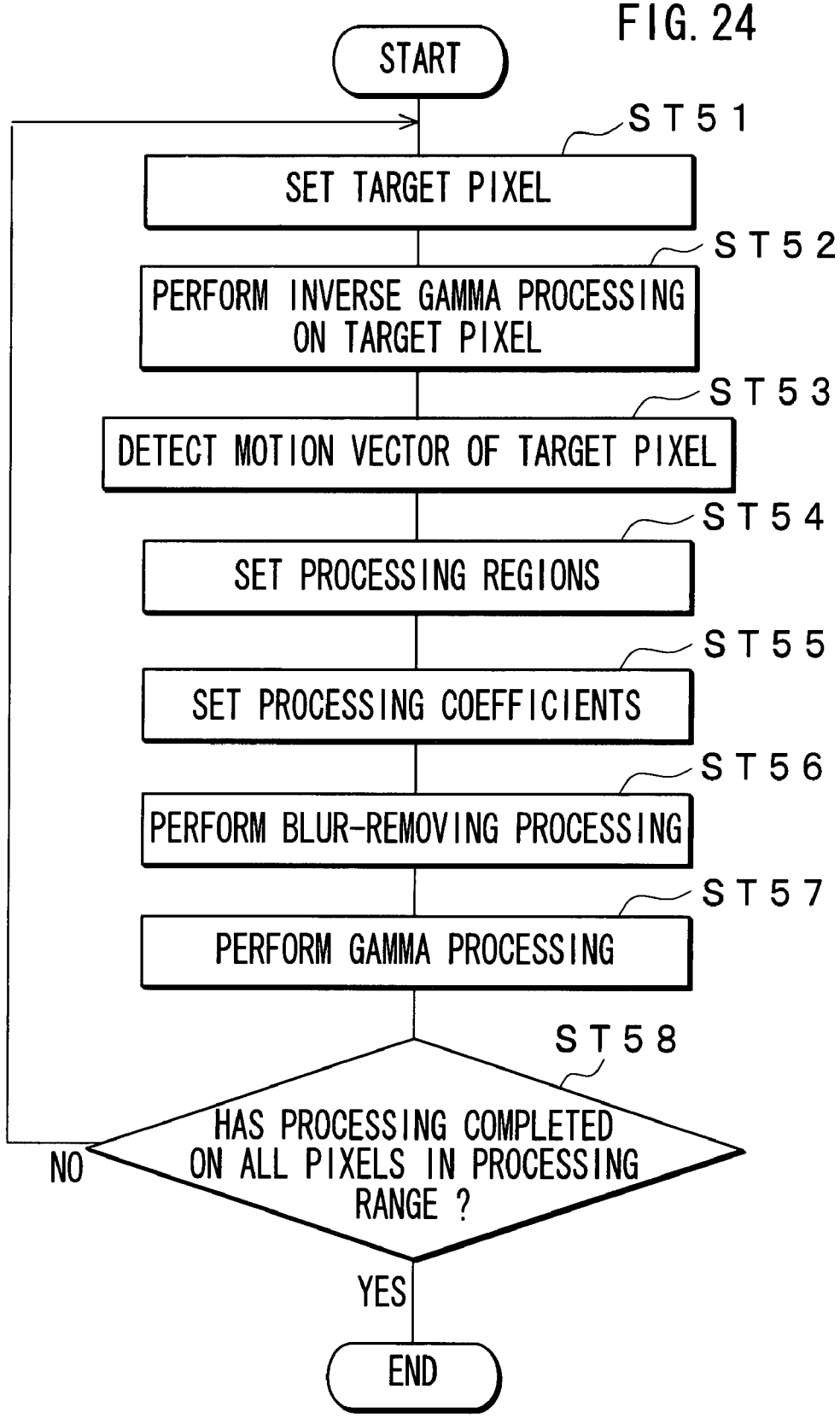
FIG. 24 is a flowchart for showing image processing in a case where the shutter is not operated.

FIG. 24 is a flowchart for showing image processing in a case where the shutter is not operated. If the shutter is not operated, at step ST51, the CPU 201 sets a target pixel from which motion blur is to be removed in a target image and proceeds to step ST52. At the step ST52, the CPU 201 performs inverse gamma processing on the target pixel based on a gamma value indicated by shooting information, to generate an image signal when an image of a real world is projected. At Step ST53, the CPU 201 detects a motion vector of the target pixel and proceeds to step ST54.

At the step ST54, the CPU 201 sets processing regions. In other words, the CPU 201 sets images to be processed based on the target pixel in the target image and sets target pixels in the images to be processed. Moreover, it sets processing regions that correspond to the motion vector obtained at the step ST53 based on the target pixels of the images to be processed and then, proceeds to step ST55. At the step ST55, the CPU 201 sets processing coefficients corresponding to a motion direction of the motion vector obtained at the step ST53 or the motion direction and a motion amount and then, proceeds to step ST56.

At the step ST56, the CPU 201 performs blur-removing processing on the images to be processed by using the processing coefficients set at the step ST55. In other words, it calculates multiply and accumulation of the pixel values of the processing ranges set at the step ST54 and the processing coefficients set at the step ST55, thereby generating a motion-blur-removed pixel value of the target pixel and then, proceeds to step ST57.

At the step ST57, the CPU 201 performs gamma processing on the target pixel by using a gamma value indicated by the shooting information, to output the gamma processed pixel value as an image signal DVout.

At step ST58, the CPU 201 determines whether the blur-removing processing is completed on all pixels in the processing range and, if the blur-removing processing is not performed yet on any of the pixels, it returns to the step ST51 while if the blur-removing processing is completed on all pixels in the processing range, the image processing on the target pixel ends. It is thus possible to eliminate the necessity of motion blur amount detection at the step ST4 in the above-described FIG. 10, thereby performing motion blur removal in simpler processing.

Processing coefficients to be stored in the processing-coefficient-setting section 37a can be obtained using the above-described model equations. In other words, by bringing a constraint of "inter-adjacent pixel difference=0" indicated in the Equation 21 and using accumulation characteristics indicated in the Equation 22, the matrix calculation is performed between pixels (corresponding to $Y_8$–$Y_{-8}$ indicated in the Equation 22) of a first region containing a target pixel in a still image corresponding to a real world variable and pixels (corresponding to $X_6$–$X_{-6}$ indicated in the Equation 22) of a second region containing pixels in an image that has encountered the same motion blur as that at a space position of the target pixel, to store, as the processing coefficients, coefficients which are used in calculation of the central pixel variable $Y_0$ that corresponds to the target pixel in the processing-coefficient-setting section 37a. By thus using the coefficients used in calculation of the central pixel variable $Y_0$ as the processing coefficients, it is possible to use pixel values of peripheral images to calculate a pixel value having motion blur removed.

Figure 25:
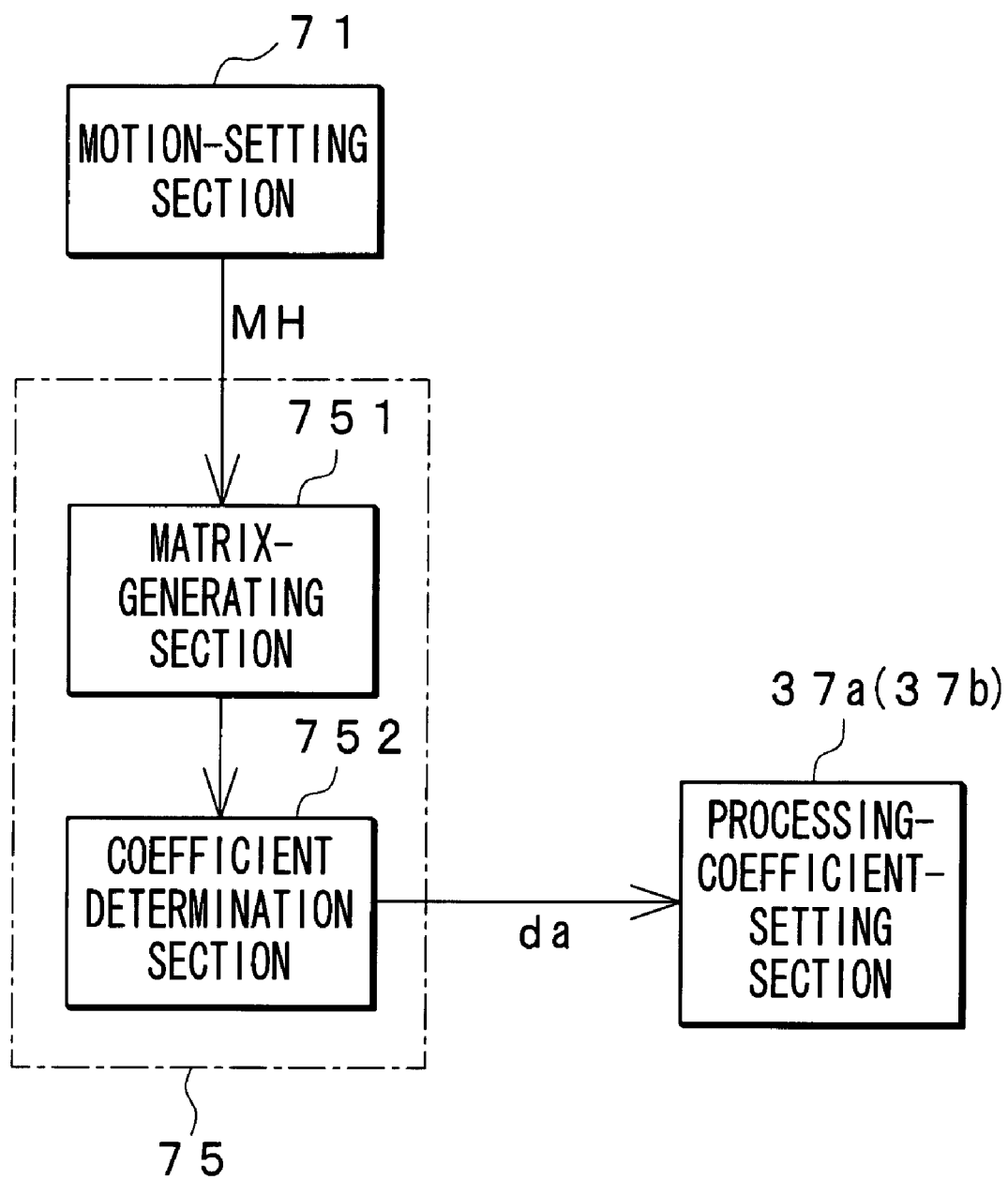
FIG. 25 is a functional block diagram of a coefficient-generating apparatus.

FIG. 25 is a functional block diagram of a coefficient generation apparatus that generates processing coefficients by using model equations. A motion-setting section 71 sets a motion direction and a motion amount and supplies a matrix-generating section 751 with motion information MH that indicates the set motion direction and motion amount.

The matrix-generating section 751 in a processing-coefficient-generating section 75, based on the motion information MH, constructs a mode constituted of at least two images to each of which a motion blur is added, to generate a matrix based on accumulation characteristics of pixel values of peripheral pixels in two images that have roughly the same space position as that of a target pixel located between two images, for example, a (t−1) frame image and a (t) frame image and a constraint of "inter-adjacent pixel difference=0".

The following will describe a method for generating processing coefficients in a case of, for example, a motion amount v=5. In this case, such a model as shown in FIG. 19 is constructed, to generate a matrix. Since main terms correspond to pixels having pixel values $X_{-3}$, $X_{-2}$, $X_2$, and $X_3$, the matrix can be expressed as Equation 28.

$$\begin{bmatrix} 0 & 0 & 0 & 1/v & 1/v & 1/v & 1/v & 1/v & 0 & 0 & 0 & 0 & 0 & 0 & 0 & 0 \\ 0 & 0 & 0 & 0 & 1/v & 1/v & 1/v & 1/v & 1/v & 0 & 0 & 0 & 0 & 0 & 0 & 0 \\ 0 & 0 & 0 & 0 & 0 & 0 & 0 & 0 & 1/v & 1/v & 1/v & 1/v & 1/v & 0 & 0 & 0 \\ 0 & 0 & 0 & 0 & 0 & 0 & 0 & 0 & 0 & 1/v & 1/v & 1/v & 1/v & 1/v & 0 & 0 \\ 1 & -1 & 0 & 0 & 0 & 0 & 0 & 0 & 0 & 0 & 0 & 0 & 0 & 0 & 0 & 0 \\ 0 & 1 & -1 & 0 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 \\ 0 & 0 & 0 & 1 & -1 & 0 & 0 & 0 & 0 & 0 & 0 & 0 & 0 & 0 & 0 & 0 \\ 0 & 0 & 0 & 0 & 1 & -1 & 0 & 0 & 0 & 0 & 0 & 0 & 0 & 0 & 0 & 0 \\ 0 & 0 & 0 & 0 & 0 & 1 & -1 & 0 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 1 & -1 & 0 & 0 & 0 & 0 & 0 & 0 & 0 \\ 0 & 0 & 0 & 0 & 0 & 0 & 0 & 0 & 1 & -1 & 0 & 0 & 0 & 0 & 0 & 0 \\ 0 & 0 & 0 & 0 & 0 & 0 & 0 & 0 & 0 & 1 & -1 & 0 & 0 & 0 & 0 & 0 \\ 0 & 0 & 0 & 0 & 0 & 0 & 0 & 0 & 0 & 0 & 1 & -1 & 0 & 0 & 0 & 0 \\ 0 & 0 & 0 & 0 & 0 & 0 & 0 & 0 & 0 & 0 & 0 & 1 & -1 & 0 & 0 & 0 \end{bmatrix} \begin{bmatrix} Y_{-8} \\ Y_{-7} \\ Y_{-6} \\ Y_{-5} \\ Y_{-4} \\ Y_{-3} \\ Y_{-2} \\ Y_{-1} \\ Y_0 \\ Y_1 \\ Y_2 \\ Y_3 \\ Y_4 \\ Y_5 \\ Y_6 \\ Y_7 \\ Y_8 \end{bmatrix} = \begin{bmatrix} X_{-3} \\ X_{-2} \\ X_2 \\ X_3 \\ 0 \\ 0 \\ 0 \\ 0 \\ 0 \\ 0 \\ 0 \\ 0 \\ 0 \\ 0 \\ 0 \\ 0 \end{bmatrix} \quad (28)$$

It is thus possible to uniquely obtain a matrix to obtain $Y_0$ as indicated in the Equation 25. In other words, it is possible to obtain processing coefficients (matrix) to be linearly combined with the pixel values $X_{-3}$, $X_{-2}$, $X_2$ and $X_3$ of the main terms in a case of the motion amount v=5. Although the above equation has added constraint equations so that unknown numbers Y may agree with the number of the equations, further constraint equation(s) may be added to establish a relationship of "unknown numbers Y<number of equations", as indicated in the Equation 22, thereby obtaining processing coefficients by using the least-squares method. Thus, the matrix-generating section 751 can generate a matrix for each motion amount as describe above so that a coefficient determination section 752 can obtain a processing coefficient for each motion amount. Further, in a case of the motion amount v=4, pixel values of the main terms are of $X_{-3}$, $X_{-2}$, $X_{-1}$, $X_1$, $X_2$, and $X_3$, thereby obtaining a matrix as that indicated in Equation 29.

(29)
$$[X_{-3} \ X_{-2} \ X_{-1} \ X_1 \ X_2 \ X_3 \ | \ 0 \ 0 \ 0 \ \cdots \ 0] =$$

$$[Y_{-7b} \ Y_{-7a} \ Y_{-6b} \ Y_{-6a} \ Y_{-5b} \ Y_{-5a} \ Y_{-4b} \ Y_{-4a} \ Y_{-3b} \ Y_{-3a} \ Y_{-2b} \ Y_{-2a} \ Y_{-1b} \ Y_{-1a} \ Y_{0b} \ Y_{0a} \ Y_{1b} \ Y_{1a} \ Y_{2b} \ Y_{2a} \ Y_{3b} \ Y_{3a} \ Y_{4b} \ Y_{4a} \ Y_{5b} \ Y_{5a} \ Y_{6b} \ Y_{6a} \ Y_{7b} \ Y_{7a} \ Y_{8b} \ Y_{8a}]$$

Figure 26A:
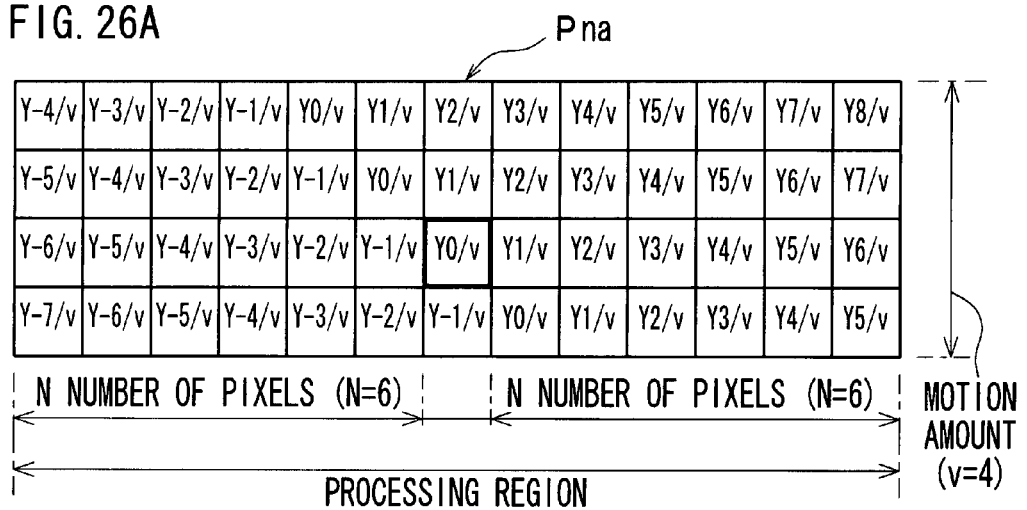
FIGS. 26A and 26B are charts each for explaining time-wise mixture of real world variables in a processing region (in a case where a motion amount v=4)
Figure 26B:
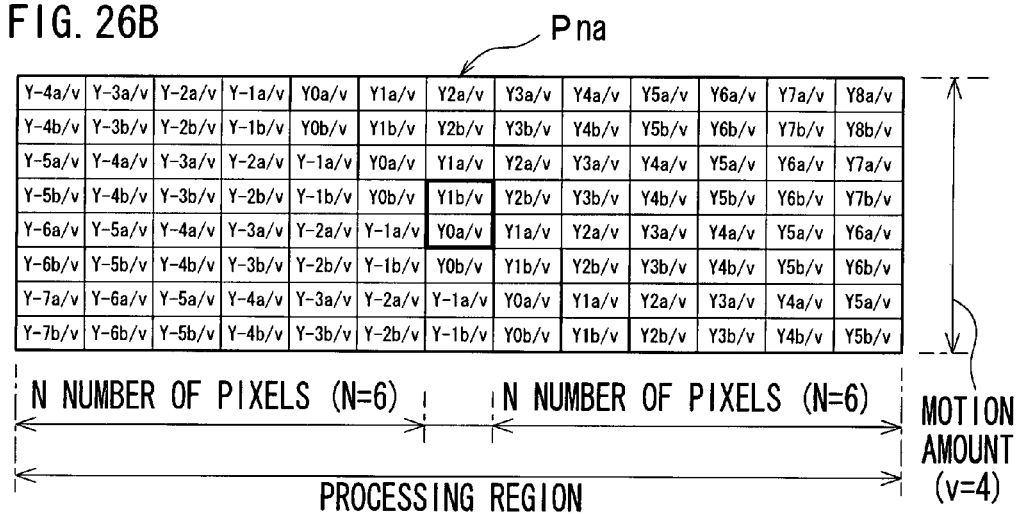

If the motion amount v is as much as an odd number of pixels, the central pixel variable $Y_0$ has its phase centered time-wise as shown in FIG. 21. However, if the motion amount v is as much as an even number of pixels, the central pixel variable $Y_0$ has its phase not centered time-wise as shown in FIG. 26A, thus encountering a difference in phase. Therefore, the virtual divisor is increased by two, to divide one frame period into eight with equal time intervals as shown in FIG. 26B. Moreover, by adding up $Y_{0a}$ and $Y_{1b}$, it is possible to obtain a value whose phase is centered time-wise as in the case of the central pixel variable $Y_0$ where the motion amount v is as much as an odd number of pixels.

Further, with taking a space phase into consideration, a main term in a case where the motion amount is as much as an odd number of pixels has its coefficient greatly fluctuating in units of two consecutive pixels. Accordingly, if obtaining a target pixel Pna by using main terms, the phase of the target pixel Pna is located at the center of the two pixels. In other words, a motion-blur-removed image has its phase shifted by a half of pixel with respect to an image relative to each of the (t−1) and (t) frames.

Figure 27:
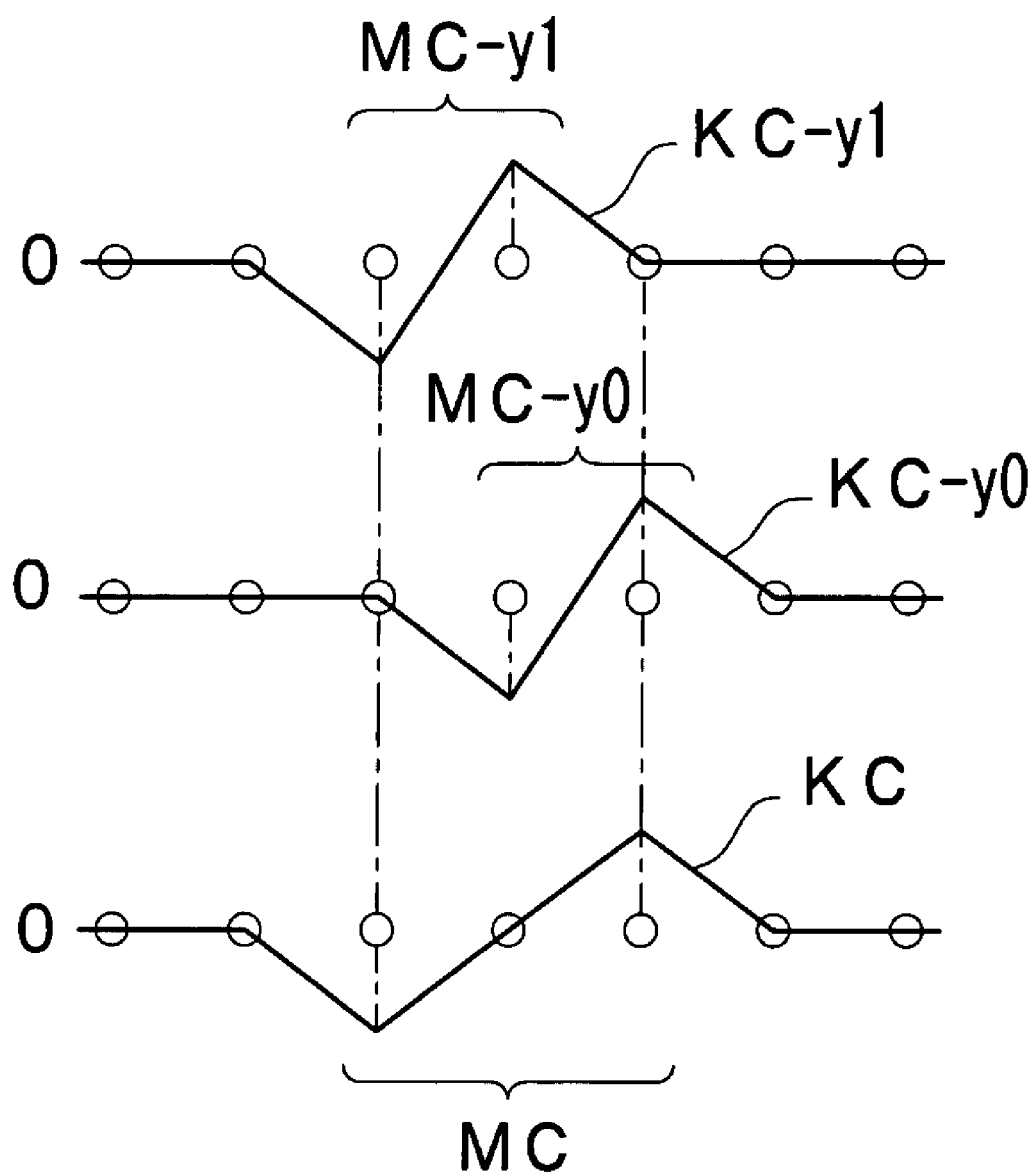
FIG. 27 is a diagram for explaining a main term and a processing coefficient in the case of matching space-directional phases with each other.

Further, to prevent occurrence of a half-pixel shift in phase, processing coefficient KC-y0 corresponding to the central pixel variable $Y_0$ and processing coefficient KC-y1 corresponding to a variable $Y_1$ (alternatively, $Y_{-1}$), as shown in FIG. 27, can be added up to subsequently use a halved processing coefficient KC. It is to be noted that in FIG. 27, circles indicate pixel positions. If such a processing coefficient KC is generated, main terms MC are provided in units of three pixels, so that by using the main terms MC and the processing coefficients KC, phase of the target pixel Pna is the same as those of pixels of the (t−1) frame image and (t) frame image, thereby enabling to be obtained an image from which the motion blur has been removed and which has the same phase as those of the (t−1) frame image and (t) frame image. When the motion amount v is as much as an even number of pixels as shown in FIG. 26B, since the virtual divisor is increased by two, the variable $Y_{0a}$ is half the variable $Y_0$ and the variable $Y_{1b}$ is half the variable $Y_1$, so that a sum of the variables $Y_{0a}$ and $Y_{1b}$ is equal to half a sum of the processing coefficient KC-y0 corresponding to the central pixel variable $Y_0$ and processing coefficient KC-y1 corresponding to a variable $Y_1$, thereby providing, in units of three pixels, main terms in a case where the motion amount v is as much as an even number of pixels.

Therefore, in a case where the motion amount v is as much as an even number of pixels or the motion amount v is as much as an odd number of pixels, as described above, by converting main terms in units of three pixels and setting processing coefficients so as to be stored, a pixel value of the target pixel from which the motion blur has been removed can be output at the same pixel position as pixels of two frames.

Figures 28A, 28B:
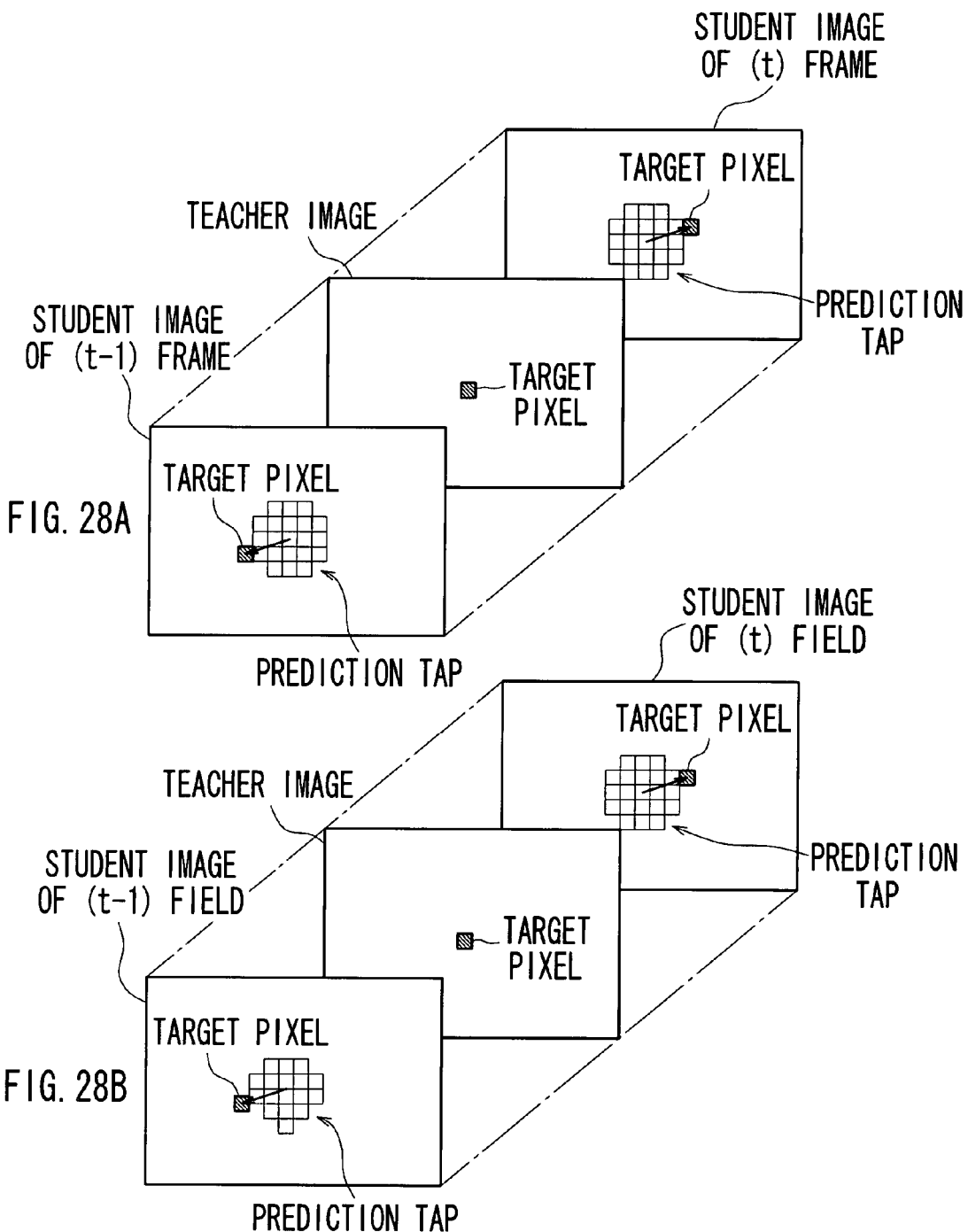
FIGS. 28A and 28B are diagrams each for explaining of operations of a case where a processing coefficient is obtained through learning.

The following describe a case where processing coefficients for main terms are obtained through learning. As shown in FIGS. 28A and 28B, a teacher image is moved to generate a (t−1) frame student image and a (t) frame student image for the teacher image. Further, learning is performed by constructing a prediction tap for each of the student images as referenced to a main term, processing coefficients for the prediction tap are obtained. In this case, the teacher image has a phase that is an average of those of the (t−1) frame and (t) frame student images. Further, positions on the student images corresponding to the target position in the teacher image correspond to positions of the main terms as being clear from FIG. 22. Therefore, a prediction tap is set so that it may extend horizontally and vertically based on the position in each of the student images that corresponds to the target pixel in the teacher image. It is to be noted that FIG. 28A shows a case of a progressive format, in which a shaded pixel is the target pixel. Further, in the case of using an image signal in an interlace format, as shown in FIG. 28B, a prediction tap is constructed based on an inter-line position in, for example, the (t−1) field. By thus constructing the prediction taps, as described above, the normal equation is calculated to generate processing coefficients.

FIGS. 29A and 29B show specific examples of processing coefficients obtained through the learning. FIG. 29A shows processing coefficients for a (t−1) field and processing coefficients for a (t) field when a motion amount is set to 20 and a motion direction is set to 0 degree. Or the other hand, FIG. 29B shows processing coefficients for the (t−1) field and processing coefficients for the (t) field when the motion amount is set to 20 and the motion direction is set to 45 degrees. If calculating a pixel value of a target pixel in the (t) field, at least when extracting a pixel value of a pixel roughly located at the same space position as the target pixel, the (t) frame tap selection section 362a extracts pixel values of the prediction taps or pixel values of the prediction taps in a direction of 0 degree or 45 degrees, as indicated by broken lines in FIG. 29A or FIG. 29B. Further the pixel-value-generating section 38a performs multiply and accumulation calculation of processing coefficients of a direction of 0 degree or 45 degrees as indicated by the broken lines and pixel values of the prediction tap, thereby calculating the pixel value of the target pixel. On the other hand, if calculating a pixel value of a target pixel in the (t−1) field, the (t) frame tap selection section 362a extracts pixel values of prediction taps or pixel values of prediction taps that are tantamount to two lines extending over the target pixel in a direction of 0 degree or 45 degrees as indicated by broken lines in FIG. 29A or FIG. 29B. Further, the pixel-value-generating section 38a performs multiply and accumulation calculation of processing coefficients that are tantamount to two lines extending over the target pixel in the direction of 0 degree or 45 degrees as indicated by the broken lines and pixel values of the prediction taps. Moreover, since the multiply and accumulation calculation that is tantamount to the two lines is performed a result of the multiply and accumulation calculation is halved to provide the pixel value of the target pixel. It is, in addition, apparent that the processing coefficients used in the multiply and accumulation calculations shown in FIGS. 29A and 29B has the same shape as that of the processing coefficients of the main terms shown in FIG. 22.

In, thus, the case where no shutter operation is executed, motion blurs can be removed with a simple configuration without equipping the motion-blur-amount-detecting section 34 or the integration section 39. Further, by using, for example, a plurality of frames or fields of main terms in the time direction, robust processing to remove the motion blurs can be performed.

Figure 30:
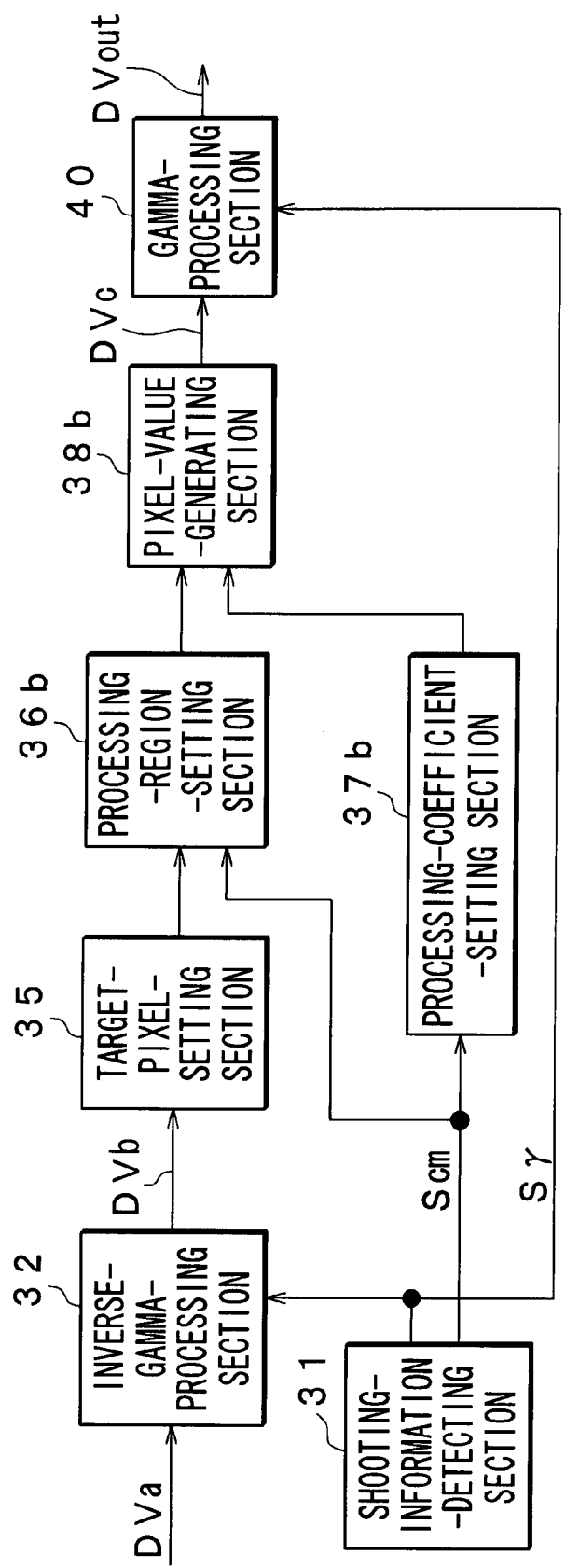
FIG. 30 is a functional block diagram of an image-processing apparatus that performs motion-blur-removing processing on a still image.

Such the motion blur removing is not limited to a motion image, but it can be also applied to a still image. FIG. 30 shows a configuration of an image-processing apparatus that performs motion blur removing on the still image. Components of FIG. 30 that correspond to those of FIG. 6 are indicated by the same symbols.

If the still image is used, a motion detection cannot be executed from the image signal DVb. Therefore, based on image pick-up section's motion information Scm that indicates a motion of the image pick-up section 10 detected by the shooting-information-detecting section 31, a processing-region-setting section 36b sets processing regions based on target pixels or main terms. Further, the processing-coefficient-setting section 37b sets processing coefficients based on the image pick-up section's motion information Scm. The pixel-value-generating section 38*b* performs multiply and accumulation calculation of pixel values of the processing regions and the processing coefficients to generate a motion-blur-removed pixel value and supplies it to the gamma-processing section 40. In such a manner, motion-blur-removing processing can be performed even on a still image by using the image pick-up section's motion information Scm that indicates the motion of the image pick-up section 10.

If using the still image, generation of processing coefficients is enabled by stretching a tap in the space direction as shown in FIG. 19 and utilizing the above-described Equation 22. It is to be noted that in the case of the motion image, main terms have been located to a position of a target pixel by employing a center of two frames as an output phase. However, in the case of the still image, the target pixel is not positioned at the main term. Further, as the motion amount increases, spacing between the target pixel and the main term increases, so that the positions of the main terms are not fixed with respect to the target pixel. Therefore, motion blur can be removed accurately from the still image by generating processing coefficients corresponding to a motion amount and a motion direction; selecting processing coefficients corresponding to the motion amount and the motion direction to use them; and performing the multiply and accumulation calculation of them and pixel values of pixels that correspond to the main terms.

INDUSTRIAL APPLICABILITY

As described above, an image-processing apparatus, an image-processing method, and an image-processing program according to the present invention may be useful in extracting information embedded into an image signal that can be obtained by pick-up imaging on a real society with an image pick-up section and be suitable for obtaining a high-resolution image from which motion blurs are removed.

The invention claimed is:

1. An image-processing apparatus comprising:
   a shooting-information-detecting section that detects shooting information from an image pick-up section;
   a motion-detecting section that selects a motion direction of an image on an overall screen from among a motion direction of the image pick-up section contained in the shooting information and a motion direction generated from image data;
   a processing-region-setting section that sets a processing region in at least any one of a predicted target image and a peripheral image thereof, which correspond to a target pixel in the predicted target image;
   a processing-coefficient-setting section that sets a motion-blur-removing-processing coefficient that corresponds to the motion direction; and
   a pixel-value-generating section that generates a pixel value that corresponds to the target pixel based on a pixel value of a pixel in the processing region and the processing coefficient.

2. The image-processing apparatus according to claim 1, further comprising:
   a motion-blur-amount-detecting section that detects a motion blur amount based on the shooting information.

3. The image-processing apparatus according to claim 2, wherein the processing-region-setting section sets a size of the processing region corresponding to the motion blur amount.

4. The image-processing apparatus according to claim 1 further comprising:
   an inverse-gamma-processing section that performs inverse gamma processing on the image based on a gamma value in the shooting information; and
   a gamma-processing section that performs gamma processing on a processed image constituted of pixel value generated by the pixel-value-generating section.

5. The image-processing apparatus according to claim 1, wherein the motion-detecting section selects a motion direction of an image on an overall screen from among a motion direction of the image pick-up section contained in the shooting information and a motion direction generated from image data for each pixel such that some pixels have a motion direction based on the shooting information and some pixels have a motion direction based on the image data.

6. The image-processing apparatus according to claim 1, wherein the motion-detecting section selects a motion direction of an image on an overall screen based on input from a user.

7. An image-processing apparatus comprising:
   a shooting-information-detecting section that detects shooting information from an image pick-up section;
   a motion-detecting section that detects a motion direction of an image on an overall screen based on a motion direction of the image pick-up section contained in the shooting information;
   a processing-region-setting section that sets a processing region in at least any one of a predicted target image and a peripheral image thereof, which correspond to a target pixel in the predicted target image, the processing-region-setting section sets a direction of the processing region corresponding to the motion direction;
   a processing-coefficient-setting section that sets a motion-blur-removing-processing coefficient that corresponds to the motion direction;
   a pixel-value-generating section that generates a pixel value that corresponds to the target pixel based on a pixel value of a pixel in the processing region and the processing coefficient; and
   a motion-blur-amount-detecting section that detects a motion blur amount based on the shooting information.

8. An image-processing apparatus comprising:
   a shooting-information-detecting section that detects shooting information from an image pick-up section;
   a motion-detecting section that detects a motion direction of an image on an overall screen based on a motion direction of the image pick-up section contained in the shooting information, the motion-detecting section detects a motion vector of the image based on the shooting information;
   a processing-region-setting section that sets a processing region in at least any one of a predicted target image and a peripheral image thereof, which correspond to a target pixel in the predicted target image;
   a processing-coefficient-setting section that sets a motion-blur-removing-processing coefficient that corresponds to the motion direction, the processing-coefficient-setting section sets the motion-blur-removing-processing coefficient based on the motion blur amount;
   a pixel-value-generating section that generates a pixel value that corresponds to the target pixel based on a pixel value of a pixel in the processing region and the processing coefficient; and
   a motion-blur-amount-detecting section that detects a motion blur amount based on the shooting information, the motion-blur-amount-detecting section detects an exposure time ratio based on the shooting information and detects the motion blur amount based on the motion vector and the exposure time ratio.

9. The image-processing apparatus according to claim 8, wherein the processing-region-setting section sets a size of the processing region based on the motion blur amount and sets a direction of the processing region based on a direction of the motion vector.

10. An image-processing apparatus comprising:
a shooting-information-detecting section that detects shooting information from an image pick-up section;
a motion-detecting section that detects a motion direction of an image on an overall screen based on a motion direction of the image pick-up section contained in the shooting information, the motion-detecting section detects a motion vector of the image;
a processing-region-setting section that sets a processing region in at least any one of a predicted target image and a peripheral image thereof, which correspond to a target pixel in the predicted target image;
a processing-coefficient-setting section that sets a motion-blur-removing-processing coefficient that corresponds to the motion direction;
a pixel-value-generating section that generates a pixel value that corresponds to the target pixel based on a pixel value of a pixel in the processing region and the processing coefficient; and
a motion-blur-amount-detecting section that detects a motion blur amount based on the shooting information, the motion-blur-amount-detecting section detects a motion amount of the motion vector as the motion blur amount.

11. An image-processing method comprising:
detecting shooting information from an image pick-up section;
selecting by a processor a motion direction of an image on an overall screen from among a motion direction of the image pick-up section contained in the shooting information and a motion direction generated from image data; and
setting a processing region in at least any one of a predicted target image and a peripheral image thereof, which correspond to a target pixel in the predicted target image;
setting a motion-blur-removing-processing coefficient that corresponds to the motion direction; and
generating a pixel value that corresponds to the target pixel based on a pixel value of a pixel in the processing region and the processing coefficient.

12. A computer readable recording medium including computer executable instructions, wherein the instructions, when executed by a processor, cause the processor to perform a method comprising:
detecting shooting information from an image pick-up section;
selecting by a processor a motion direction of an image on an overall screen from among a motion direction of the image pick-up section contained in the shooting information and a motion direction generated from image data;
setting a processing region in at least any one of a predicted target image and a peripheral image thereof, which correspond to a target pixel in the predicted target image;
setting a motion-blur-removing-processing coefficient that corresponds to the motion direction; and
generating a pixel value that corresponds to the target pixel based on a pixel value of a pixel in the processing region and the processing coefficient.

* * * * *